(12) United States Patent
Kelly et al.

(10) Patent No.: US 8,774,950 B2
(45) Date of Patent: Jul. 8, 2014

(54) APPARATUSES, SYSTEMS, AND METHODS FOR APPARATUS OPERATION AND REMOTE SENSING

(75) Inventors: Alonzo James Kelly, Pittsburgh, PA (US); Herman Herman, Pittsburgh, PA (US); Peter William Rander, Mars, PA (US); Randon Warner, Allison Park, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 221 days.

(21) Appl. No.: 12/812,800

(22) PCT Filed: Jan. 22, 2009

(86) PCT No.: PCT/US2009/000398
§ 371 (c)(1),
(2), (4) Date: Dec. 6, 2010

(87) PCT Pub. No.: WO2009/136969
PCT Pub. Date: Nov. 12, 2009

(65) Prior Publication Data
US 2011/0066262 A1 Mar. 17, 2011

Related U.S. Application Data

(60) Provisional application No. 61/011,854, filed on Jan. 22, 2008.

(51) Int. Cl.
*G08B 17/00* (2006.01)
*G05B 23/02* (2006.01)
(52) U.S. Cl.
CPC .................. *G05B 23/0267* (2013.01)
USPC ................................................ 700/65; 700/83
(58) Field of Classification Search
USPC ........ 700/28, 52, 90, 245, 255, 65, 83; 701/1, 701/300, 301, 408, 431, 516; 340/901, 340/932.2, 937, 988; 348/113, 115, 116, 348/118, 119, 148, 333.02; 703/17
See application file for complete search history.

(56) References Cited

U.S. PATENT DOCUMENTS

| | | | |
|---|---|---|---|
| 5,963,710 A | 10/1999 | Masumoto | |
| 6,160,371 A | 12/2000 | Tachikawa | |
| 6,327,522 B1 * | 12/2001 | Kojima et al. | 701/1 |
| 6,374,155 B1 | 4/2002 | Wallach et al. | |
| 6,654,670 B2 * | 11/2003 | Kakinami et al. | 701/1 |
| 6,825,880 B2 * | 11/2004 | Asahi et al. | 340/932.2 |

(Continued)

*Primary Examiner* — Charles Kasenge
(74) *Attorney, Agent, or Firm* — Fox Rothschild LLP; Dennis M. Carleton

(57) ABSTRACT

A method and system for controlling an apparatus including receiving data indicative of an actual state of the apparatus, defining a first viewpoint relative to at least one of the environment and the apparatus, determining a first predicted state of the apparatus at time T, determining a first predicted state of the environment at time T, producing a first virtualized view from the first viewpoint, sending a first control signal to the apparatus after producing the first virtualized view, defining a second viewpoint relative to at least one of the apparatus and the environment, determining a second predicted state of the apparatus at time T+delta T, determining a second predicted state of the environment at time T+delta T, producing the second virtualized view from the second viewpoint, sending a second control signal to the apparatus after producing the second virtualized view, and changing the actual state of the apparatus based on the first control signal.

23 Claims, 19 Drawing Sheets

(56) References Cited

U.S. PATENT DOCUMENTS

| | | |
|---|---|---|
| 7,106,217 B2 | 9/2006 | Judge et al. |
| 7,366,595 B1 * | 4/2008 | Shimizu et al. ............... 701/301 |
| 7,405,746 B2 * | 7/2008 | Wakimoto et al. ............ 348/116 |
| 7,411,167 B2 * | 8/2008 | Ariyur et al. .................. 701/513 |
| 7,554,461 B2 * | 6/2009 | Edanami .................... 340/932.2 |
| 7,640,107 B2 * | 12/2009 | Shimizu et al. ............... 701/523 |
| 7,640,108 B2 * | 12/2009 | Shimizu et al. ............... 701/301 |
| 7,643,064 B1 * | 1/2010 | Jouppi ....................... 348/211.9 |
| 7,668,626 B2 * | 2/2010 | Katayama et al. ................. 701/1 |
| 7,720,572 B2 * | 5/2010 | Ziegler et al. ................. 700/245 |
| 7,737,965 B2 * | 6/2010 | Alter et al. .................... 345/419 |
| 7,761,173 B2 * | 7/2010 | Ehrlich .......................... 700/83 |
| 7,948,404 B2 * | 5/2011 | Tran ............................ 340/961 |
| 8,019,145 B2 * | 9/2011 | Asatani et al. ................ 382/153 |
| 8,406,464 B2 * | 3/2013 | Karazi .......................... 382/103 |
| 2006/0187224 A1 * | 8/2006 | Ehrlich ........................ 345/522 |
| 2006/0287825 A1 * | 12/2006 | Shimizu et al. ............... 701/216 |
| 2006/0287826 A1 * | 12/2006 | Shimizu et al. ............... 701/216 |
| 2007/0276541 A1 | 11/2007 | Sawasaki |
| 2007/0279493 A1 * | 12/2007 | Edanami .................... 340/932.2 |
| 2007/0297320 A1 | 12/2007 | Brummette et al. |
| 2008/0046940 A1 * | 2/2008 | Katayama et al. ............. 725/105 |
| 2008/0122654 A1 * | 5/2008 | Sakakibara ................ 340/932.2 |

\* cited by examiner

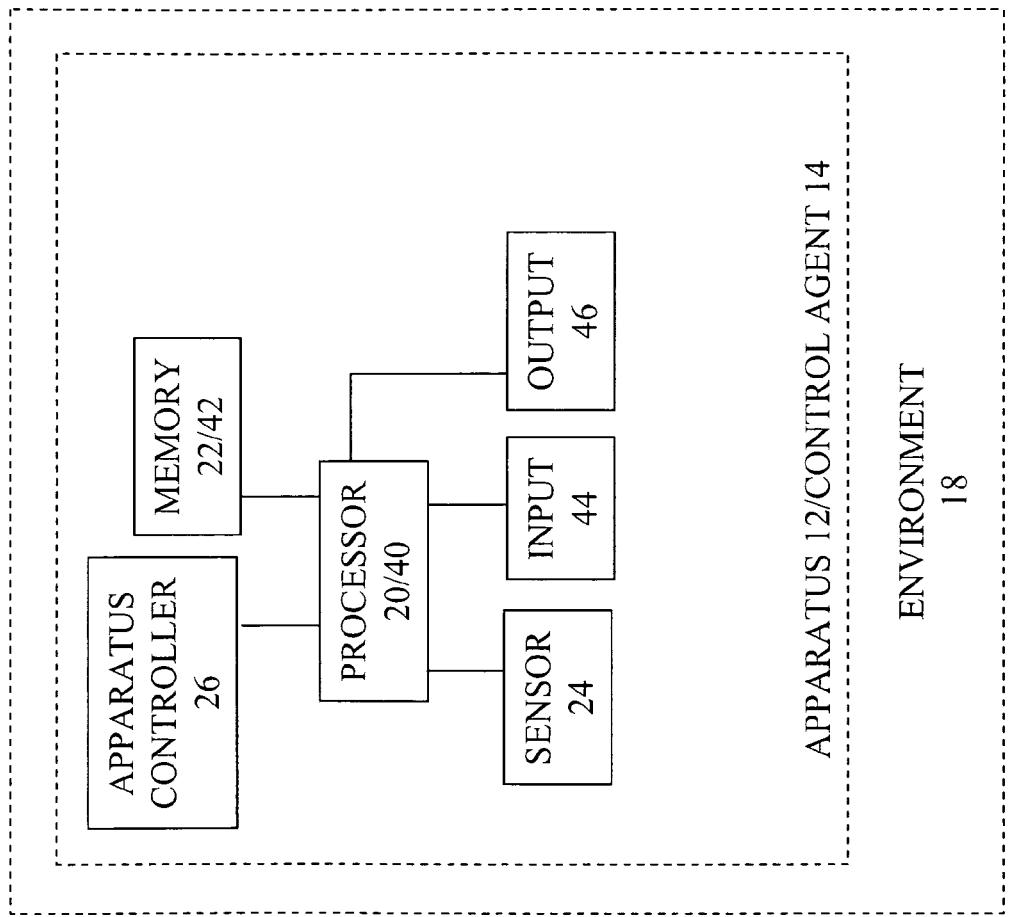
Fig. 2

```
// xyz0 = last known vehicle position
// rpy0 = last known roll/pitch/yaw (orientation)
// v0 = last known velocity
// w0 = last known turn rate
// t0 = time of last known measurements
// t1 = time to which prediction must extend dt = 0.01;      // simulation timestep [seconds]
t = t0;         // set initial sim time
xyz = xyz0;     // set initial sim position
rpy = rpy0;     // set initial sim orientation
v = v0;         // set initial sim velocity
w = w0;         // set initial sim rotation rate timeleft = t1 - t0
while (timeleft > 0)
{
  timeleft -= dt;   // decrement time left in sim
  t += dt;          // incriment sim time ds = v * dt;   // linear motion during time step
  dw = w * dt;   // angular motion duting time step // compute pose
  xyz += vehicleToWorldTransform * ds;
  rpy += dw;

// apply commands
  v += accel_lin_cmnd * dt;
  w += accel_ang_cmnd * dt;
}
```

Fig. 13

APPARATUSES, SYSTEMS, AND METHODS FOR APPARATUS OPERATION AND REMOTE SENSING

CROSS-REFERENCE TO RELATED APPLICATIONS

This application claims priority from U.S. Provisional Patent Application No. 61/011,854, filed Jan. 22, 2008, which is incorporated herein by reference.

STATEMENT REGARDING FEDERALLY-SPONSORED RESEARCH AND DEVELOPMENT

This invention was made, in part, with government support under contract W56HZV-04-C-0745 entitled "Improved Situational Awareness through Colorized Ranging", and awarded by DCS Corporation under contract from TARDEC, part of the U.S. Army Research, Development and Engineering Command (RDECOM). The United States government may have certain rights in this invention.

FIELD OF THE INVENTION

The present invention is directed generally to methods, apparatuses, and systems for apparatus operation and remote sensing, and for the creation of synthetic views and virtual windows in applications related to apparatus operation and remote sensing.

BACKGROUND OF THE INVENTION

Remote apparatus operation and remote sensing are desirable in many applications and situations. For example, dangerous activities such as military operations, crime prevention, underground mining, exploration, and other activities benefit from remote apparatus operation and remote sensing. Similarly, situations and applications where rare expertise or skill are required can also benefit, such as where operation of a apparatus or analysis of a situation require a person not physically present in at the location of interest.

Prior art attempts to provide for remote apparatus operation and remote sensing have several significant drawbacks. One problem is that prior art systems often require more bandwidth than is readily available in many real world situations. In particular, typical prior art systems include a remote controlled apparatus having a camera and other sensors which are used to provide feedback for the remote operator. Video, audio, and other data (such as position, orientation, and state of the apparatus) are typically sent to the operator via a communications link. However, relatively large bandwidth is required to carry video, audio, and other data from the apparatus to the operator and to carry instructions from the operator to the apparatus. As a result, there are often problems with the necessary bandwidth not being available, or with interruptions to the transmissions. In such situations, the feedback from the apparatus can become inconsistent. For example, the video and audio can be become choppy, making it difficult for the operator to perform the desired tasks.

In addition, in the case of wireless communications links, wireless transmissions often pass through one or more repeaters as well as other equipment necessary for processing the signals, such as for compressing and decompressing the data. As a result, prior art systems include a noticeable latency between the input from the operator and the feedback signals from the apparatus. This latency creates problems in at least two ways. For example, when the operator receives feedback from a moving apparatus, that feedback is not current (due to the latency in the system) and a moving apparatus is actually in a different position that what is being displayed to the operator. In addition, the operator's instructions to the apparatus are not received by the apparatus until some time after the operators sends those instructions. As a result, the apparatus is receiving instructions well after the operator would like to provide those instructions to the apparatus. In addition, the operator is seeing the results of those instructions being executed well after the operator expects to see the instructions executed.

The bandwidth required by the prior art systems and the latency inherent in those prior art systems cause a number of problems. One problem caused by the latency in the prior art systems is that it is difficult to operate the remote apparatus effectively. In particular, an operator quickly becomes aware of the latency in the system, and that the operator's inputs are not being acted on by the apparatus until a noticeable time has passed. In order to operate an apparatus accurately, operators tend to drive very cautiously, stopping before an input is required and waiting for the situation to become static before providing additional inputs. For example, before negotiating a turn or passage through a tight space, an operator will typically stop the apparatus and wait for the situation to become static. At that point, operators typically provide a series of small inputs, stopping after each input to wait for the situation to again become static, until finally achieving the desired orientation of the apparatus. Once the apparatus is properly oriented, the operator will typically proceed slowly through the maneuver, repeating the above steps if it is necessary to again change the orientation of the apparatus.

Another problem with latency in the prior art systems is that some operators tend to become disorientated and nauseated by the effects of operating a apparatus in a system exhibiting significant latency.

One solution proposed by the prior art is to connect an optical fiber between the apparatus and the remote operator. A direct fiber optic communications link between the apparatus and the operator would eliminate a significant portion of the latency in the prior art systems. This solution also allows for greater bandwidth. However, this solution also limits the distance between the operator and the apparatus and is impractical in many situations. This solution also is vulnerable because the communication link can be broken if the optical fiber is severed. As a result, this solution is not practical in hostile operations such as military operations, operations in busy environments such as urban areas, in situations where there is other vehicle traffic which may break the optical fiber, and in situations where the apparatus may turn around and run over its own optical fiber.

Another solution proposed by the prior art is to increase the bandwidth, or the effective bandwidth, of the wireless link. While this solution can reduce the interruptions in the feedback from the apparatus, is can also create other problems such as increasing latency. For example, increasing the effective bandwidth often involves using increased data compression, which tends to increase latency by requiring additional processing of the data signals.

Other solutions involve using supervisory control where interaction with the remote apparatus is less frequent and the apparatus assumes more autonomy For example, in space exploration (such as rovers on Mars), the human involvement is infrequent because of the long transmission delays. In these situations, the remote apparatus receives input and executes those instructions. The remote apparatus then stops and waits while feedback is sent to the operator, while the operator considers the feedback, and while new instructions are sent to the apparatus. This creates frequent periods of time in which the apparatus is waiting for instructions. It raises the risk of mission failure due to reliance on the competence of the apparatus rather than the human. It also results in a slow and tedious operation that proceeds in a manner similar to that in which humans operate in high latency systems, as described above.

Accordingly, there is a need for improved methods, apparatuses, and systems for remote apparatus operation and remote sensing, particularly for methods, apparatuses, and systems in which latency is reduced or compensated and relatively low bandwidth communications links are utilized. Those and other advantages of the present invention will be described in more detail hereinbelow.

BRIEF SUMMARY OF THE INVENTION

The present invention will generally be described in terms reducing or eliminating the apparent latency in the transmission of a real-time data from a sensor to a control agent. In some embodiments of the invention the latency is not actually reduced, although the present invention makes it appear to the operator that the latency has been reduced or eliminated. Alternatively, this aspect of the present invention may be considered to be latency compensation. In particular, prediction of future events is used to compensate for latency in the system. However, as will be described in more detail hereinbelow, prediction is not perfect and in some situations the prediction is less effective than in other situations. For example, when driving around a corner into unknown terrain or in other situations in which the data is unknown or incomplete, the prediction will be less effective.

The control agent may be a person (e.g., a human operator) or a device, such as a control system for an autonomous apparatus. The sensor will generally be moving with respect to the scene, and the scene may or may not be static. In other words, elements of the scene may or may not move with respect to each other and with respect to the sensor. In some embodiments, elements such as cars and people may be moving in the scene. In other embodiments, only the apparatus and sensors are moving in the scene. If the scene is generally static, the sensor may only send data when changes are detected, thereby reducing bandwidth usage. If the scene is not static, the sensor may continue to update the data to capture scene motion.

In one embodiment, the present invention is related to remote apparatus operation and remote sensing, as well as to related operations and technologies. The present invention has many applications and many advantages over the prior art including providing for the reduction or elimination of latency in remote apparatus operations, providing for a reduction in required bandwidth, providing improved data compressions, and providing for de-coupled video between a apparatus and an operator located remote from the apparatus.

In one embodiment the present invention is a method for controlling an apparatus in an environment. The invention includes receiving data indicative of an actual state of the apparatus, defining a first viewpoint relative to at least one of the environment and the apparatus, determining a first predicted state of the apparatus at time T, determining a first predicted state of the environment at time T, producing a first virtualized view from the first viewpoint, sending a first control signal to the apparatus after producing the first virtualized view, defining a second viewpoint relative to at least one of the apparatus and the environment, determining a second predicted state of the apparatus at time T+delta T, determining a second predicted state of the environment at time T+delta T, producing the second virtualized view from the second viewpoint, sending a second control signal to the apparatus after producing the second virtualized view, and changing the actual state of the apparatus based on the first control signal.

In this method, T is current time plus additional time representative of latency for a control signal to be received and implemented by the apparatus. The first predicted state of the apparatus is determined from at least one previous actual state of the apparatus. The first virtualized view uses encoded data, and the first virtualized view is indicative of both the first predicted state of the apparatus at time T and the first predicted state of the environment at time T. Delta T is a difference in a time between displaying the first virtualized view and a second virtualized view and the second predicted state of the apparatus is estimated from at least one previous actual state of the apparatus and from at least one previous control signal to the apparatus. The second virtualized view uses encoded data and the second virtualized view is indicative of both the second predicted state of the apparatus at time T+delta T and the second predicted state of the environment at time T+delta T.

In another embodiment, the present invention is a system for operation in an environment, comprising an apparatus including a sensor, a control agent, a processor connected to at least one of the apparatus and control agent, and a memory device connected to the processor. The memory includes computer-readable instructions which, when executed by the processor, cause the processor to perform steps described herein. For example, the system of the present invention may perform the steps described above with regard to the method, or it may perform different steps as described herein.

The present invention allows for a reduction in the required bandwidth between the sensor and the control agent. In particular, static elements of the scene need only be transmitted from the sensor to the control agent once. Thereafter, images of those elements do not need to be retransmitted between the remote apparatus and the control agent, thereby reducing the required bandwidth. Many variations are possible with the present invention. For example, objects that are initially far away are imaged poorly and it is often desired to image them again as the camera gets closer. In general, video from a moving camera contains substantially the same data from frame to frame, and the present invention can remotely predict future views (wholly or partially) and can elect to transmit additional data to improve the image or it can elect not to transmit the data and reduce the required bandwidth. Similarly, bandwidth can also be further reduced by intentionally dropping frames and compensating for the dropped frame with predicted views from the previously-imaged static elements.

The present invention can also enhance the apparent field of view of a synthetic camera based on predicted views. The use of predicted views also allows the present invention to reduce the field of view of the real camera, and thereby increase the resolution of the real camera so as to produce more detailed images.

In some embodiments, the present invention can provide a) a capacity to predict the motion of a moving camera, b) knowledge of scene appearance and geometry, and c) the normally high level of redundancy of video data, in order to enhance the quality of an associated video stream in multiple ways.

The present invention can be applied in the context of a camera which is moving with respect to a scene and is producing video for use by the control agent. The connection from camera to the control agent may be real-time or not.

Either the camera, the control agent, or both may be mounted on a apparatus. While the camera is moving with respect to the scene, elements of the scene may also be moving with respect to each other. If they are, the camera would image those elements on a sufficiently regular basis for the purpose of the control agent.

The present invention may also render arbitrary perspectives based on rendering databases. For example, computer graphics technology, referred to herein as a "renderer", can be used to generate realistic synthetic imagery of a synthetic scene which is represented in a rendering database in a computer. To produce such imagery, a synthetic camera viewframe is defined. "Viewframe" will sometimes also be referred to as "viewpoint". If a synthetic appearance camera moves with respect to the synthetic scene, a synthetic video (motion picture) can be produced from any virtual field of view, thereby allowing for arbitrary synthetic cameral views.

The present invention can also include or be embodied as computer software which, when executed by a processor, causes the processor to perform certain actions according to the present invention.

Many variations are possible with the present invention, and these and other teachings, variations, and advantages of the present invention will become apparent from the following detailed description of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments, and not for purposes of limiting the invention, wherein:

FIG. 2 illustrates a system according to another embodiment of the present invention.

FIG. 13 illustrates a pseudo code sequence corresponding to one embodiment of an algorithm used with the present invention.

DETAILED DESCRIPTION OF THE INVENTION

Figure 1:
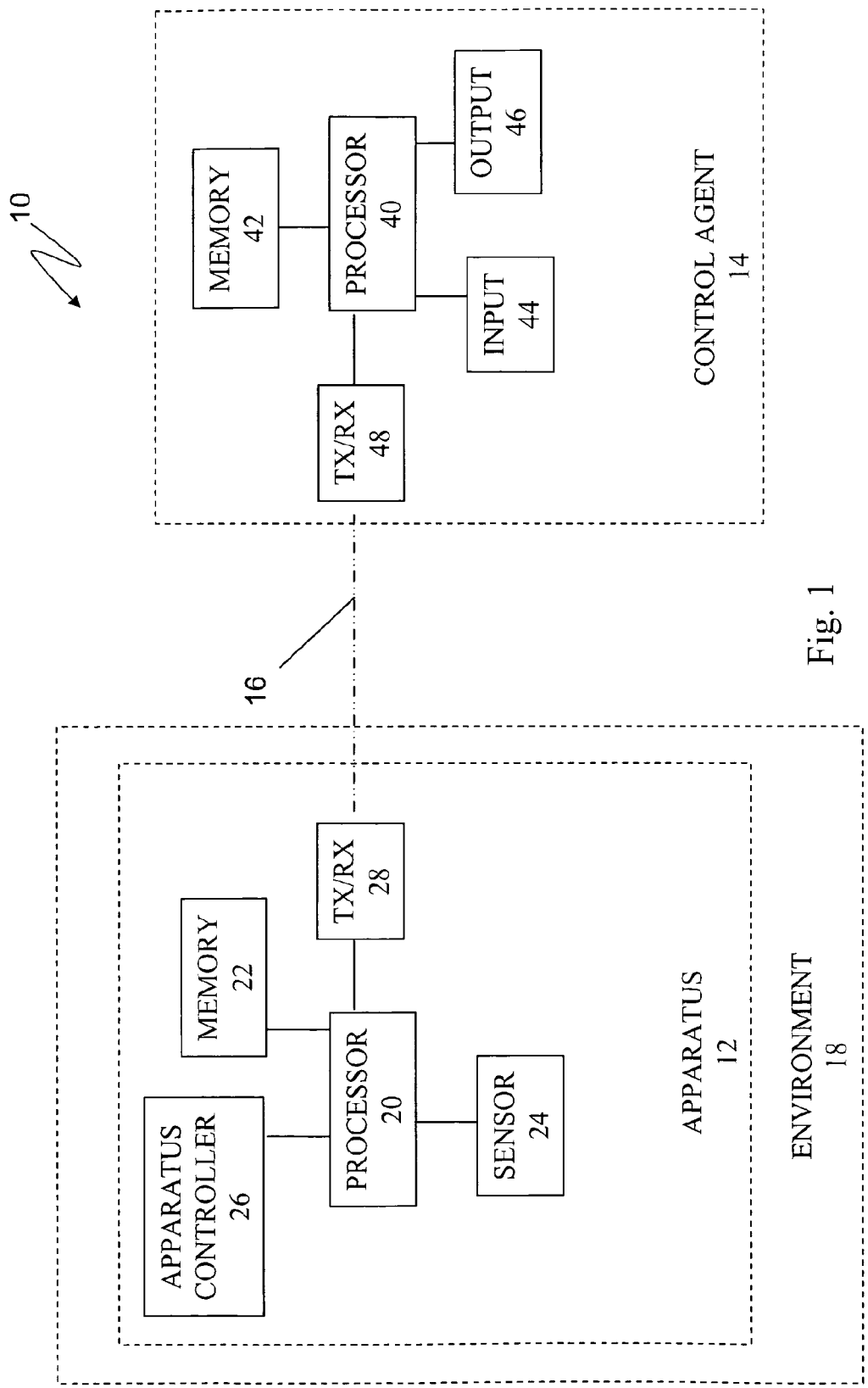
FIG. 1 illustrates a system according to one embodiment of the present invention.

FIG. 1 illustrates a system 10 according to one embodiment of the present invention. The system 10 includes a apparatus 12 and an control agent 14. In the illustrated embodiment, the apparatus 12 is separate from the control agent 14, and the apparatus 12 and control agent 14 are connected via a communications link 16. In this embodiment, the apparatus is referred to as a "remote apparatus" 12 because it is separated from the control agent. However, in other embodiments of the system 10, the control agent is within the apparatus 12, in which case the apparatus 12 is not a "remote" apparatus. Furthermore, the communications link 16 will generally be described in terms of a wireless communications link 16, although the present invention may also be used with communications links over physical media, such as electrical conductors and optical fibers. Also, the communications link 16 may be more than one communications link to allow, for example, for redundancy or increased bandwidth. Similarly, more than one apparatus 12 and more than one control agent 14 may be used with the system 10. A single control agent 14 may control one apparatus or a single control agent 14 may control more than one apparatus. In some embodiments, two or more control agents 14 may collectively control one or more apparatuses 14. There may also be one or more redundant control agents 14. Other variations are also possible.

The remote apparatus 12 includes a processor 20, a memory device 22, a sensor 24, a apparatus controller 26, and a transmitter/receiver 28. The processor 20 is connected to the memory 22, the sensor 24, the apparatus controller 26, and the transmitter/receiver 28. The memory 22 includes computer readable instructions, such as computer hardware, software, firmware, or other forms of computer-readable instructions which, when executed by the processor 20, cause the processor 20 to perform certain functions, as described herein.

The apparatus 12 may be a stationary apparatus 12 or a mobile apparatus 12. For example, the apparatus 12 may be a car, truck or other mobile apparatus. Alternatively, the apparatus 12 may be stationary, such as a crane, or other apparatus that can move but which is not mobile (i.e., which does not normally travel from one location to another location under its own power and control). In some embodiments the present invention will be described in teens other than apparatus, such as remote controlled vehicles, although the present invention is not limited to such specific embodiments.

The apparatus 12 will operate in an environment 18. The environment 18 is the space around the apparatus 12. The environment 18 may be, for example, an urban area with paved roads, buildings, and people. The environment 18 may also be a rural area in which the apparatus 12 moves on dirt roads or through fields and trees. The environment 18 in which the apparatus 12 operates may be different than the environment in which the control agent 14 is located. For example, the control agent 14 may be located near the apparatus 12 or far away from the apparatus 12.

The processor 20 sends information to the control agent 14 via the wireless communications link 16. The processor 20 also receives instructions via the wireless communications link 16, processes those instructions, and provides control signals, such as to the apparatus controller 26. The processor 20 also sends information to and receives information from the sensor 24. The processor 20 also performs other functions as described herein. For example, as described hereinbelow, the processor 20 may reduce bandwidth usage by not sending information that can be recreated by the control agent 14.

The memory device 22 can be any form of computer-readable memory, and may store information in magnetic form, electrical form, optical-readable form, or other forms. The memory 22 includes computer-readable instructions which, when executed by the processor 20, cause the processor 20 to perform certain functions as described herein. The memory 22 may be separate from the processor 20, or the memory 22 may be integrated with the processor 20. The memory 22 may also include more than one memory device, which may be integrated with the processor 20, separate from the processor 20, or both.

The sensor 24 may be any type of sensor, and the sensor 24 may be one sensor or a combination of two or more sensors. The sensors 24 can be located together or at different parts of the remote apparatus 12. For example, the sensor 24 may include a video input device, an audio input device, infrared sensors, range finders, and other devices. In some embodiments, two or more cameras 24 may be provided to provide stereo vision, trinocular vision, and other forms of sensing the environment 18. Other variations and combinations are also possible.

The present invention will generally be described in terms of a single real camera 24 producing a real-time video feed and a single synthetic camera producing a virtualized view of the real scene. However, many variations are possible with the present invention and multiple real cameras 24 of any modality operating in any combination may be used. Also, more than one synthetic camera may also be used or produced. The real camera 24 and the synthetic camera may be operating at the same time or at different times.

In addition, direct encoding may replace cameras and certain other sensors 24. For example, the data produced by cameras 24 may instead be otherwise known in the form of human-derived knowledge of the scene. For example, map data used in combination with a positioning system, such as GPS, may be used. Such knowledge may be directly encoded in the same manner that computer programmers encode any database for graphics programs today.

The apparatus controller 26 receives instructions from the processor 20 and controls the remote apparatus 12. The apparatus controller 26 may control some or all aspects of the remote apparatus 12, such as steering, acceleration, braking, etc. In other embodiments, the apparatus controller 26 may be eliminated, such as when a human operator is directly controlling functions of the apparatus 12.

The transmitter/receiver 28 transmits and receives information via the wireless communications link 16. The transmitter/receiver 28 may be one unit or it may be more than one unit, such as separate transmitter and receiver units and multiple transmitters and receivers.

Many variations are possible according to the present invention. For example, more than one processor 20, memory 22, sensor 24, apparatus controller 26, and transmitter/receiver 28 may be present in the remote apparatus 12. In addition, devices not shown may also be included in the remote apparatus 12, and devices shown may be combined or integrated together into a single device, and other devices may be omitted. For example, the remote apparatus 12 may include user input and output devices for use if humans are present in the remote apparatus 12 during operation, and to allow for maintenance and trouble shooting when the apparatus 12 is not in operation.

The control agent 14 includes a processor 40, a memory device 42, an input device 44, an output device 46, and a transmitter/receiver 48. The processor 40 is connected to the memory 42, the input device 44, the output device 46, and the transmitter/receiver 48. The memory 42 includes computer readable instructions, such as computer hardware, software, firmware, or other forms of computer-readable instructions which, when executed by the processor 40, cause the processor 40 to perform certain functions, as described herein.

The processor 40 sends and receives information via the wireless communications link 16. The processor 40 receives information via the wireless communications link 16, processes that information, provides information to the output device 46, receives information from the input device 44, and sends control signals to the remote apparatus 12 via the wireless communications link 16. The processor 12 also performs other functions as described herein.

The memory device 42 can be any form of computer-readable memory, and may store information in magnetic form, electrical form, optical-readable form, or other forms. The memory 42 includes computer readable instructions which, when executed by the processor 40, cause the processor 40 to perform certain functions as described herein. The memory 42 may be separate from the processor 40, or the memory 42 may be integrated with the processor 40. The memory 42 may also include more than one memory device, which may be integrated with the processor 40, separate from the processor 40, or both.

The input device 44 may be a keyboard, a touchscreen, a computer mouse, wearable devices that record the body language of the user, or other forms of inputting information from a user. For example, in embodiments where the user is not a human, the input device 44 may be any appropriate interface with the non-human user. In some embodiments, the input 44 may be eliminated and, for example, the apparatus 12 may be controlled directly by the processor 40.

The output device 46 may be a video display, audio output, and/or other forms of outputting information to a user. Many types of output devices may be used, such as video screens, heads-up displays, motion simulators, and others. For example, in embodiments where the user is not a human, the output device 46 may be any appropriate interface with the non-human user, or the output device 46 may be eliminated.

The transmitter/receiver 48 transmits and receives information via the wireless communications link 16. The transmitter/receiver 48 may be one unit or it may be more than one unit, such as separate transmitter and receiver units and multiple transmitters and receivers.

Many variations are possible according to the present invention. For example, more than one processor 40, memory 42, input device 44, output device 46, and transmitter/receiver 48 may be present in the control agent 14. In addition, devices not shown may also be included in the control agents 14, and devices shown may be combined or integrated together into a single device, and other devices may be omitted.

FIG. 2 illustrates a system 10 according to another embodiment of the present invention. In that embodiment, the user and the control agent 14 are in the apparatus 12. This system 10 may be used, for example, to allow one or more users to utilize "virtual windows" to view their surroundings outside of the apparatus 12 without the use of real windows. These embodiments are particularly useful in dangerous environments 18, such as military conflicts where windows are a weakness in apparatus. Virtual windows and other advantages of the illustrated system 10 and the present invention will be described in more detail hereinbelow.

The system 10 shows that various parts of the apparatus 12 and the control agent 14 have been integrated together. For example, the processors 20/40 and the memory 22/42 and shown as being shared. In other embodiments, however, the processors 20/40 and/or the memory 22/42 may be kept separated and co-located in the apparatus 12. In addition, the transmitters/receivers 28/48 and the communications link 16 are not shown because of the integration of the control agent 14. However, there may still be transmitters, receivers, and communications links between various parts of the system 10 within the apparatus 12, and an external communications link 16 may exist between the apparatus 12 and another location. Furthermore, in embodiments where some or all of the control agent 14 is not integrated with the apparatus 12 components, then internal transmitters/receivers and communications links will still be needed to connect the control agent 14. Also, the apparatus controller 26 is illustrated in this embodiment, although the apparatus controller 26 may be eliminated in some embodiments if the system 10 will not control the apparatus 12.

More detailed embodiments of parts of the present invention will now be described in more detail. As will be used herein, "viewframe" means a specification of the information needed to predict the image that would be produced by a camera 24. Such information includes the position (x,y,z) of the sensor 24 center of projection, the orientation (roll, pitch, yaw) of the sensor 24 housing, the horizontal and vertical field of view, the horizontal and vertical pixel resolution, the projection rule (perspective, azimuth first spherical polar, elevation first spherical polar, cylindrical polar, etc.), and the modality (appearance, range, both) of the sensor 24. "Viewframe" will sometimes be referred to as "viewpoint".

Also, "virtualized" view means a view of a scene based on real appearance (and perhaps geometry) data which is rendered from the perspective of a different viewframe than the original data. Such views are referred to as virtualized because, while virtual, they encode a corresponding real physical scene.

Figure 3:
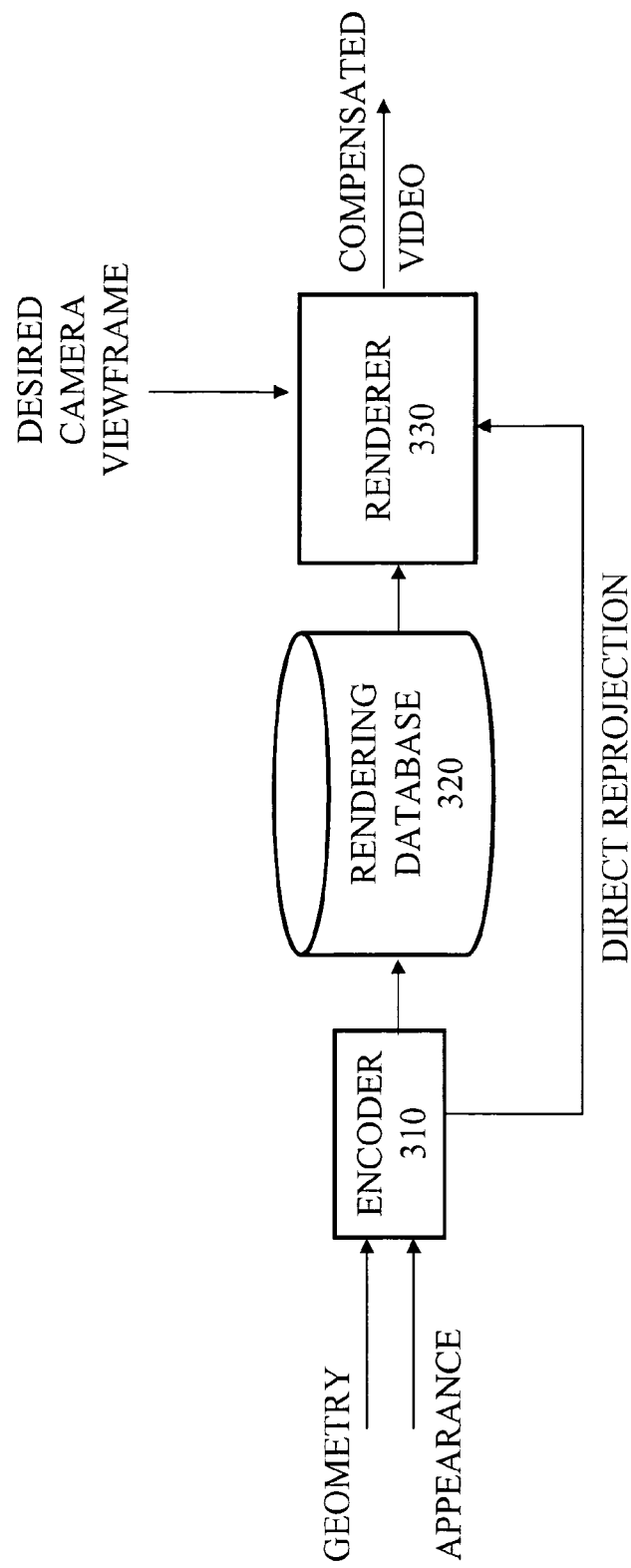
FIG. 3 illustrates the virtualized rendering process according to one embodiment of the present invention.

FIG. 3 illustrates one embodiment of a portion of the control agent 14 for producing visualized rendering according to the present invention. The illustrated embodiment includes an encoder 310, a rendering database 320, and a renderer 330. One or more processors 40 in the control agent 14 may embody the functions of the encoder 310 and the renderer 330. The memory 42 in the control agent 14 may serve as the rendering database 320. The memory 42 may also include computer readable instructions which, when executed by the processors 40, cause the processors 40 to perform the functions of the encoder 310 and the renderer 330.

The encoder 310 receives data indicative of the appearance and geometry of the surroundings of the remote apparatus 12. The data is received via the communications link 16 from the sensor 24 in the remote apparatus 12. The encoder 310 encodes this data and provides it to the rendering database 320. The encoder 310 also provides direct reprojection to the renderer 330. Direct reprojection does not form a rendering database but merely uses a analytic or implicit expression of scene geometry to generate a computational rule for distorting imagery to produce one synthetic view from another real one. The key is that the scene geometry is not stored but directly represented in the algorithm as a formula. An example is a "homography" operation which produces a synthetic image of a planar scene from one perspective given an image produced from another perspective. The basic distinction is one between "data" and "code". A second implication of direct reprojection is that the memory implicit in the database is also not used.

The rendering database 320 may involve explicit data storage or implicit analytic representations (e.g., the road is flat). The rendering database 320 may also include a combination of real-time data, off-line data (previously recorded), and entirely synthetic data. The rendering database 320 may, for example, store data indicative of the known photogeometric images. The rendering database 320 receives and stores the encoded data from the encoder 310, and this data is accessed by and used by the renderer 330. A relatively simple form of rendering database 320 is the collection of all of the photogeometric images obtained to date. When reprojecting such data, the most recent video frame which contains the data of interest would be used. Such an approach has no data compression advantages. In another embodiment, photogeometric imagery is converted into graphics primitives appropriate for the chosen renderer. One approach is to average geometry information to produce a terrain map. Another is to convert local neighborhoods of range pixels into polygons (typically triangles) and texture map the color information onto the triangles. Several special cases are noteworthy. In some cases, a desired pixel is entirely unknown because the real camera did not view the associated scene point. Little can be done about such missing parts. In others, the color of a real pixel is known but its range is not known (e.g. beyond the range limits of the imaging LADAR). Such data can sometimes be placed on a distant flat surface known as billboard to create a useful virtualized view. When it is difficult to compute polygons from the data, an alternative is to render the data as colorized points or as flat surfaces facing the real camera which subtend a pixel solid angle at range. The present invention will sometimes be described in terms of range, and the present invention will sometimes be described in terms of parallax. However, both range and parallax indications may be used with the present invention. The use of parallax indications is sometimes desirable in the present invention because parallax indications do not depend on knowledge of range. In some situations, such as stereo, range and parallax indications are more or less equivalent and, generally, the process of direct reprojection is one of applying a parallax function to one image in order to produce another.

The rendering database 320 may be produced, for example, either from stereo vision or a combination of a camera and an imaging range camera. In the latter case, either the LADAR data is colorized by finding the color pixels corresponding to each range pixel in the color camera. Otherwise, the color data is rangefied by finding an appropriate range pixel for each color pixel. Either process may require projection rectification and interpolation. Adequate system calibration is a practical requirement. The resulting registered color and range imagery (produced by stereo vision or a camera and a LADAR or a camera and geometry assumptions) will be referred to as photogeometric imagery.

In addition, the knowledge of appearance and geometry can be used by the present invention to enable the rendering database 320. In particular, data from real cameras 24 can be combined algorithmically to produce a rendering database 320 from which computer graphics technology can produce its imagery. The fundamental enabler for the production of such a database is knowledge of both the geometry (shape) and the appearance of all parts of the scene to be rendered.

Also, a virtualized rendering database 320 enables arbitrary visualized views. The combination of a virtualized rendering database 320 and a renderer 330 creates the capacity to produce synthetic views of reality for an arbitrary viewframe. In some cases, the rendering database 320, having been produced by one or more other views of the scene, may not be complete, but at least the parts of the associated scene which are known can be rendered.

Furthermore, scene memory enables synthetic increases in field of view. When static elements of the scene are no longer in view, memory of their geometry and appearance that is encoded in the rendering database 320 can be used to produce views of elements that are no longer in view of the real camera 24 used to produce the database 320. This technique creates a synthetic increase of the field of view of the synthetic camera. It may also be used to deliberately reduce the field of view of the real camera 24 (in order to increase its pixel resolution) because the apparent field of view can be increased synthetically.

In the case where no rendering database is produced, a photogeometric image can function as an instantaneous rendering database that is discarded after use, as illustrated by the process of "direct reprojection" in FIG. 3. Each pixel in the real photogeometric image produces a colorized 3D point in the scene (x,y,z,r,g,b). Each such point is rendered into the desired virtual view to determine its pixel coordinates and color. When all are rendered interpolation is used to fill in any gaps.

The renderer 330 receives data indicative of the camera viewframe desired by the user. The renderer 330 accesses the rendering database 320, receives data from the rendering database 320, and produces synthetic views. Any number of synthetic views may be generated simultaneously from the same rendering database 320. For example, one synthetic view could be that of a synthetic camera positioned coincidentally with a human driver's instantaneous head position. Furthermore, when there is no real window, a synthetic view display on the apparatus interior can be used to permit "indirect driving", where a synthetic view is created when actual line of sight does not exist. Another synthetic view may be created viewing from a position above and behind a apparatus, thereby providing a synthetic line of sight from an advantageous perspective. When different maneuvers are required, such as moving close to an obstacle, a synthetic view may be created looking at the side of the apparatus near the front so that distance can be more easily judged. If an apparatus is backing up, a synthetic view of the rear of the apparatus may be created. Synthetic overhead views looking exactly downward can be generated for driving effectively in close quarters to obstacles and hazards.

The synthetic views are synthetic imagery of a synthetic scene represented in the rendering database 320 and produced from the perspective of the desired viewframe. The renderer 330 provides the synthetic views in the form of compensated video output to the output device 46. If a synthetic appearance camera moves with respect to the synthetic scene, or vice-versa, a synthetic video (motion picture) is produced. A commercial renderer can be readily used once the database is placed in appropriate form. The inventors have used the OpenGL library and various tools based on it to define the database format. Then the graphics hardware provided in almost all modern computers can placed the data appropriately on screen. The renderer 330 may also perform other functions. For example, video prediction is a rendering process once the desired viewframe is known. Determining the desired view is discussed herein with respect to motion prediction.

When a static camera 24 images a static scene, all images are identical so that any can be predicted from any other. When a camera 24 moves with respect to a static scene, images are no longer identical but each new one often contains much information which is common with previous images. Such high levels of redundancy create opportunities to transform the data into a canonical representation, which eliminates the redundant information, as a powerful form of data compression. The rendering database 320 mentioned above can be designed to eliminate all redundancy by directly and uniquely representing the scene elements that are being imaged—rather than all of their possible views.

Under many realistic circumstances the position and orientation (collectively known as "posture" here) of a moving camera 24 can be predicted from knowledge of its historical postures, and/or their time derivatives. If the camera 24 is on a apparatus 12, knowledge of the shape of the terrain ahead, and any knowledge of the motion commands applied to the apparatus 12 can be used to improve the prediction. Such a predictive capacity creates an opportunity to extrapolate the video stream from the camera by simply predicting the present position of the camera 24 given knowledge of the latency in effect. This is illustrated in more detail with respect to FIG. 4.

Figure 4:
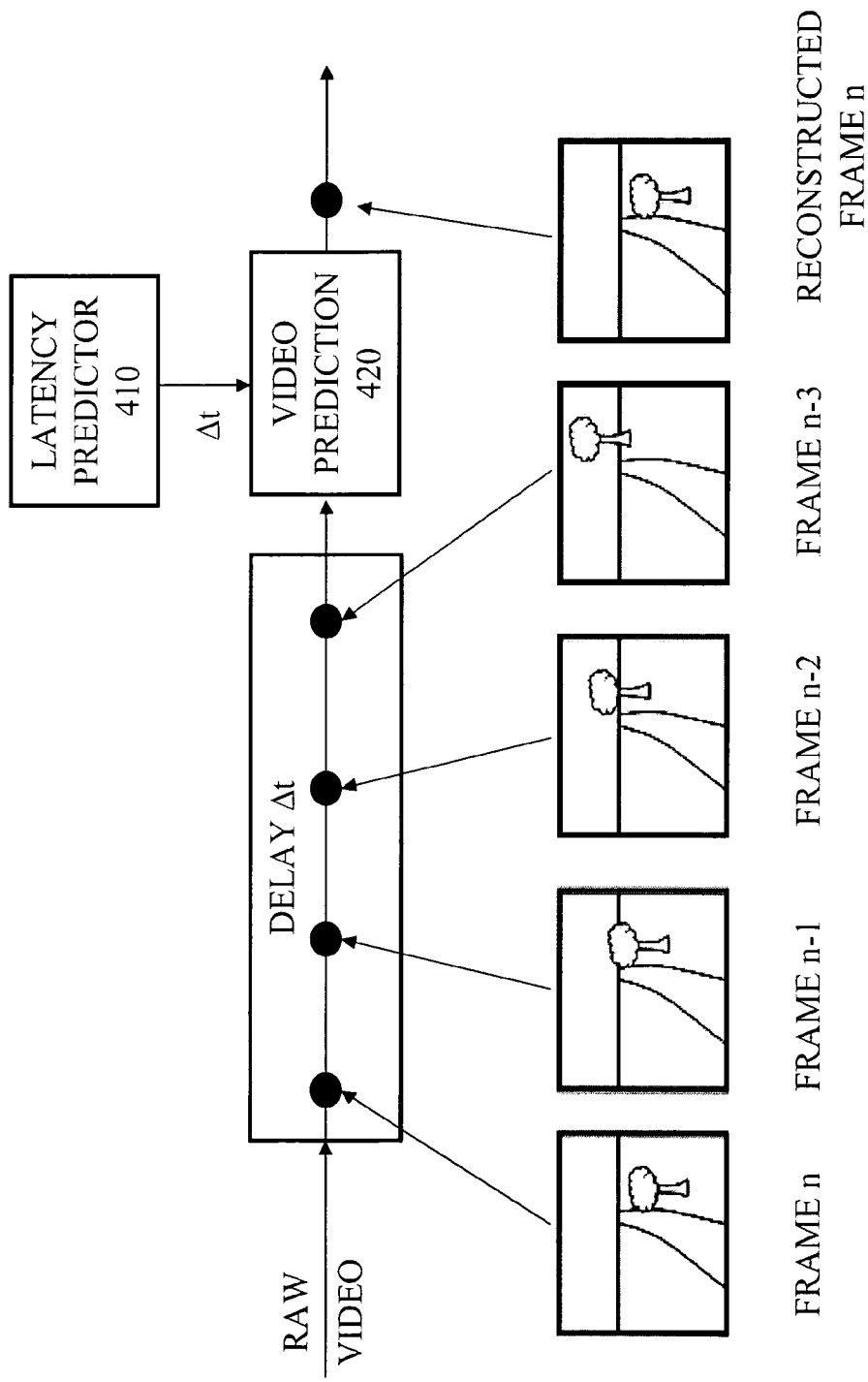
FIG. 4 illustrates the process for extrapolating the image stream according to one embodiment of the present invention.

FIG. 4 illustrates one embodiment of a portion of the control agent 14 including a latency predictor 410 and a video predictor 420. This embodiment may be used for extrapolating the image stream by predicting latency (latency predictor 410) and using this prediction to predict dropped frames and/or latency free imagery (video prediction 420).

Latency is created because of the time required between the capturing the data by the sensor (e.g., a scene is imaged by a camera) and receiving the data by the control agent 14. This latency is illustrated as "delay $\Delta t$". In the illustrated embodiment, several frames of images are in transit at the same time. This example simulates a car driving along a road and approaching a tree. Several frames (n, n-1, n-2, n-3) have been captured by the sensor 24 and are in the process of being transmitted to the control agent 14. These frames illustrate the movement along the road and the approach to the tree. In that example, frame n is being transmitted from the remote apparatus 12 while frame n-3 still has not yet been received at the control agent 14. As a result, the data being received at the control agent 14 is delayed from the actual conditions at the remote apparatus 12. This illustrates the latency of the system 10. The present invention compensates for this latency as described below.

The latency predictor 410, predicts the magnitude of the latency, as described in more detail hereinbelow. The video predictor 420 predicts relative motion between the apparatus 12 and the scene based on the predicted latency. As a result, the video predictor 420, compensates for the latency to produce a predicted scene for the user. In the illustrated embodiment, the video predictor 420 produces "reconstructed frame n" which predicts the current scene, or frame n, before frame n is received. To the extent the reconstructed frame differs from the actual data received, the system 10 will update the image presented to the user with the actual or corrected data when it becomes available. One embodiment of the video predictor 420 will be described in more detail hereinbelow with respect to FIG. 5.

Figure 5:
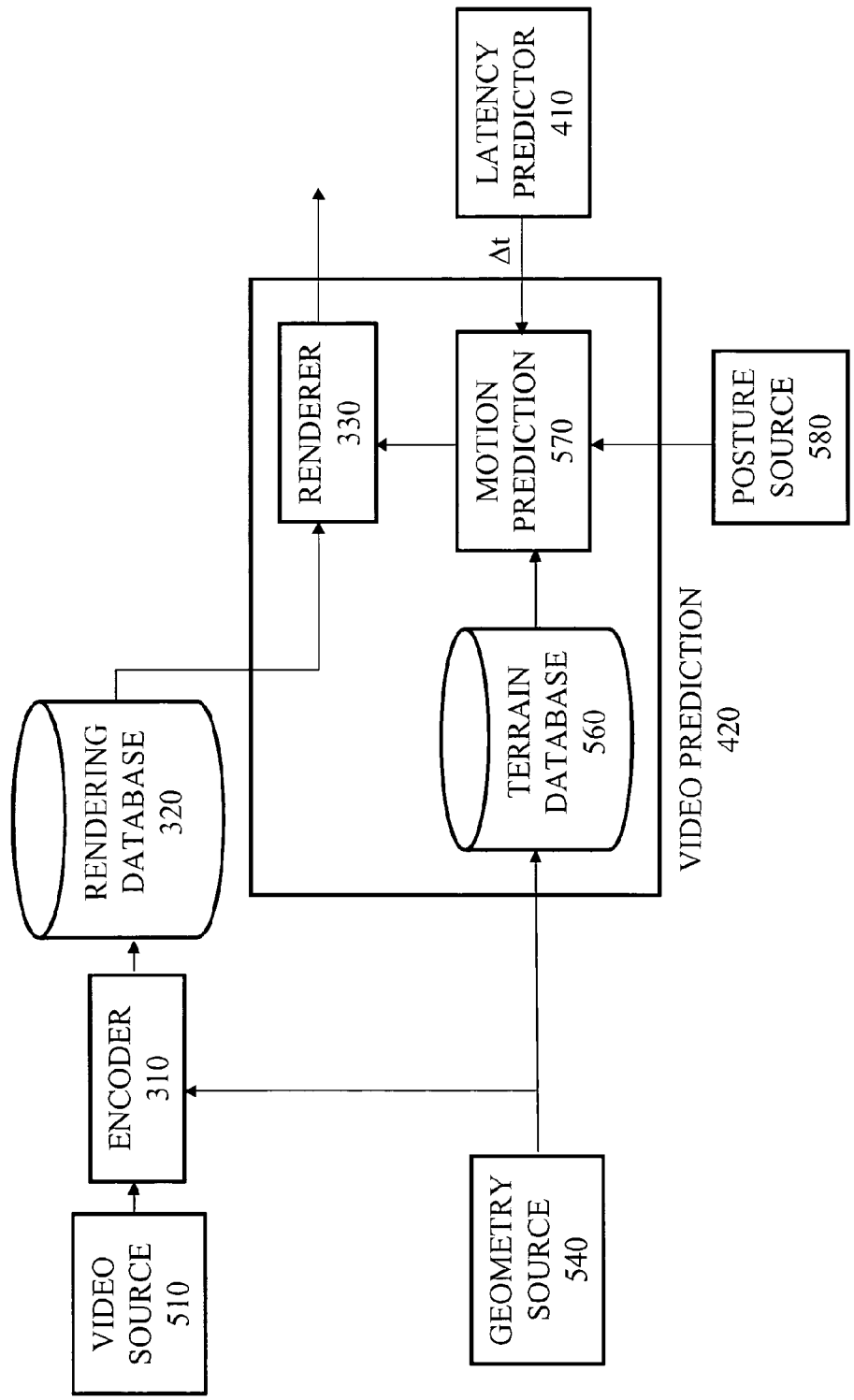
FIG. 5 illustrates one embodiment for use in real-time remote control or indirect driving of a vehicle

FIG. 5 illustrates one embodiment of a portion of the control agent 14 for producing video extrapolation with terrain and motion prediction according to the present invention. The illustrated embodiment includes a video source 510 and a geometry source 540, both of which provide data to a rendering database 320 through an encoder 310. The geometry source 540 also provides data to a terrain database 560 A posture source 580 and a latency predictor 410 provide data to a motion predictor 570. The motion predictor 570 also receives data from the terrain database 560, and the motion predictor 570 provides data to the renderer 330. The renderer 330 receives data from the motion predictor 570 and from the rendering database 320, and provides output indicative of terrain and motion prediction.

FIG. 5 illustrates a more detailed embodiment of the video predictor 420 including the renderer 330, the terrain database 560, and the motion predictor 570. The video predictor 420 may be an enhanced form of the renderer 330 including the terrain database 560 and the motion predictor 570.

The renderer 330 and the rendering database 320 may be the same as those illustrated in FIG. 3, or they may be different. The geometry source 540 may be, for example, ladar, stereo vision, radar, assumption, or other devices as described herein.

The video source 510 is provided via the communications link 16 from the sensor 24 in the remote apparatus 12. One or more processors 40 in the control agent 14 may embody the latency predictor 410 and the renderer 330. The memory 42 in the control agent 14 may be used for the rendering database 320 and the terrain database 560. The memory 42 may also include computer readable instructions which, when executed by the processors 40, cause the processors 40 to perform the functions of the encoder 310 and the renderer 330.

The illustrated embodiment can be used for real-time remote control or indirect driving of a host apparatus 12. In this case, geometry data is also used to produce the terrain database 560 that is used by a motion prediction process (the motion predictor 570) to predict the motion of the apparatus 12 and hence the camera or sensor 24 mounted on it. The last known camera posture is used (posture source 580) along with a prediction of the time elapsed since the last video frame (latency predictor 410) to produce a predicted camera posture which is used by the renderer 330.

The latency predictor 410 calculates the latency in the communications between the remote apparatus 12 and the control agent 14, and vice versa. Latency can be measured, for example, by sending round trip messages or by using synchronized clocks at the transmitter and receiver. In some cases, latency is constant and it can be determined experimentally once and for all.

The motion predictor 570 predicts the motion of the remote apparatus 12. Motion prediction involves analytic continuation of the equations of motion of the desired viewframe camera. In a simple embodiment, the last known posture and velocity are simply integrated forward in time by the desired amount. If velocity is not measured, it may be estimated from the last two postures. In a more general embodiment, the geometry information from the real camera 24 is used to produce a terrain map upon which the remote apparatus 12 is known to be traveling. In this case, both motion commands to the apparatus 12 and the terrain shape may be used in the equations of motion.

Figure 6:
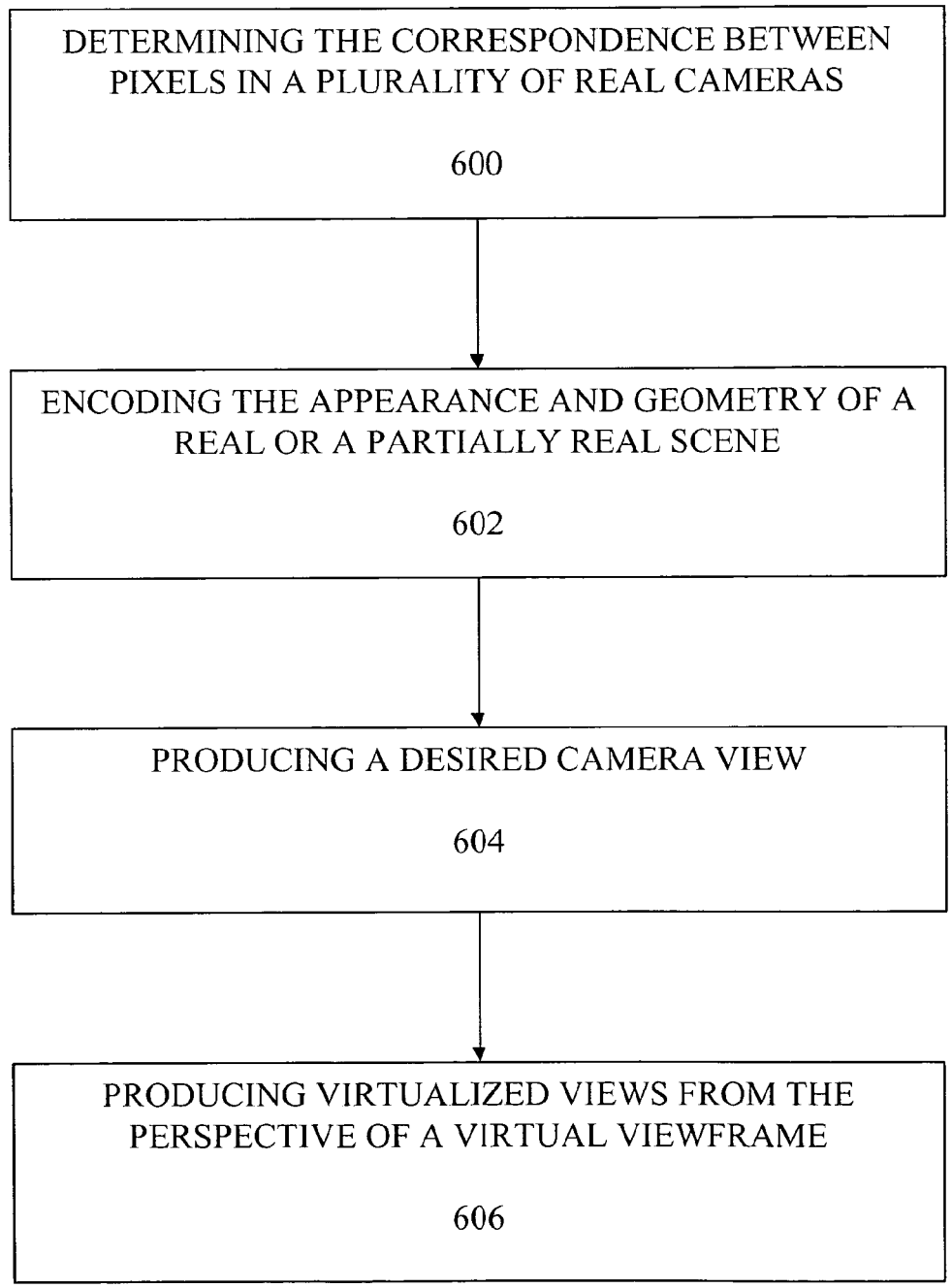
FIG. 6 illustrates a method according to one embodiment of the present invention for viewframe compensation of a video stream from a moving camera.

Some of the methods according to the present invention will now be described in more detail. FIG. 6 illustrates a method according to one embodiment of the present invention for compensation of a video stream from a moving camera 24. The view may be created from any desired viewframe.

Step 600 includes determining the correspondence between pixels in a plurality of real cameras 24. This step may be performed, for example, with an encoding algorithm and may be done, for example, to produce photogeometric imagery and/or to produce a rendering database 320.

Step 602 includes encoding the appearance and geometry of a real of partially real scene. This step may be performed, for example, with the rendering database 320. Examples of this step include a single high resolution overhead image or an implicit assumption of flat floor or terrain.

Step 604 includes producing a desired camera view. The viewframe for that view may be defined as fixed or moving with respect to any object of interest.

Step 606 includes producing virtualized views from the perspective of a virtual viewframe. This step may be performed, for example, with a renderer 330 that uses the output of either of the above two steps 600, 602. Where a rendering database 320 is used, the data stream from the camera 24 may be disconnected.

The desired viewframe of step 604 may be defined for: (1) synthetically moving a camera 24 to a new position desired by the user, (2) producing a synthetically wide field of view of synthetically high resolution for a camera 24, (3) creating the capacity to actually reduce the field of view and/or increase the resolution of a real camera 24, (4) producing a synthetic view through a solid surface which is not present in reality, not present in the rendering database 320, or is explicitly removed from the rendering database 320, (5) producing an augmented reality display wherein parts of the rendering database 320 are entirely synthetic, (6) producing a view from a viewframe instantaneously coincident with a user's head posture (such as when a user is wearing a heads-up display) in order to create a false but very useful sense of being positioned elsewhere (such as in order to prevent a challenge based on utility), and (7) producing a line-of-sight view from a virtual flying camera that follows a apparatus 12 that carries the real camera 24 producing the data.

The present invention also includes a method of data compression. The data compression may be used, for example, with a video stream from the remote apparatus 12. This method includes the steps 600-606 from FIG. 6, wherein the rendering database 320 is encoded in terms of computer graphic primitives, such as polygons and points. The rendering database 320 is used to efficiently differentiate new and old information so that only the new information is transmitted to a remote site where a copy of the database 320 is also being assembled.

The above method of data compression may be achieved by rendering from the database 320 after it is produced based only on a sequence of camera poses. This method can produce a video from a fixed size rendering database 320 whose length is limited only by the capacity to store the pose sequence.

Figure 7:
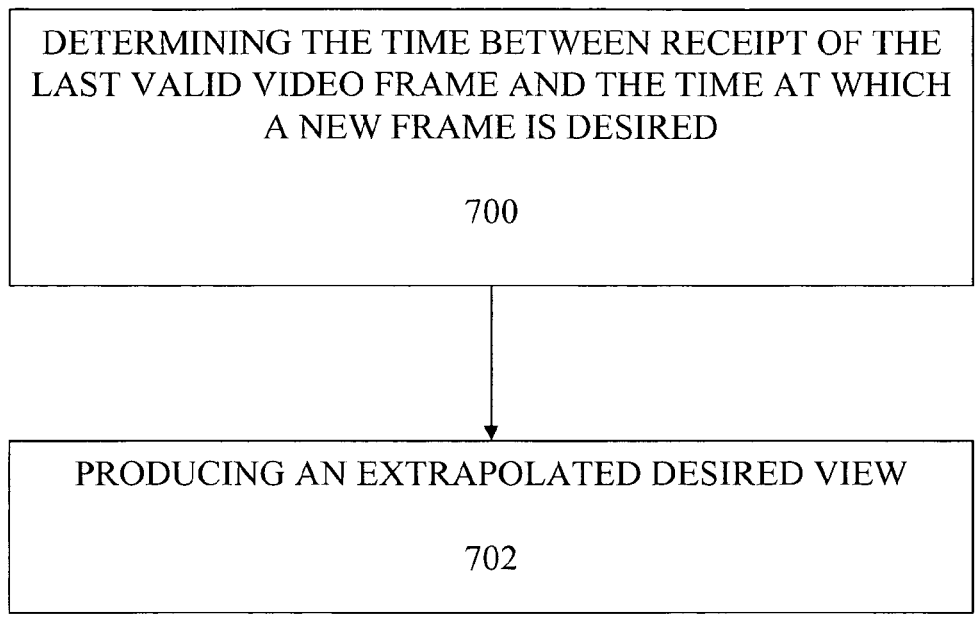
FIG. 7 illustrates a method according to one embodiment of the present invention for extrapolating a video stream from a moving camera.

FIG. 7 illustrates a method according to one embodiment of the present invention for extrapolating a video stream from a moving camera 24.

Step 700 includes determining the time between receipt of the last valid video frame and the time at which a new frame is desired. This step may be performed by the latency predictor.

Step 702 includes producing an extrapolated desired view from the time between receipt of the last valid video frame and the time at which a new frame is desired. This step may be performed by a video predictor 420 which uses earlier video frames, such as those encoded in a rendering database 320, in order to produce the extrapolated desired view. When the receive time of the last valid frame is used, the method may be used to predict dropped frames. When the imaging time of the last valid frame is used, the method may be used to compensate for latency in a video communications system.

The method of FIG. 7 may be adapted to a camera 24 on a moving apparatus 12. For example, a terrain data base may be formed in real-time from the camera data. Thereafter, a motion prediction algorithm may be used to predict the motion of the apparatus 12 over the terrain based on optional terrain information and optional knowledge of the commands to the apparatus 12.

The method of FIG. 7 may also be turned into a compression algorithm wherein frames or parts of frames (including fixed parts of the field of view) are deliberately dropped from transmission in order to reduce the input data rate at the receiver.

Figure 8A:
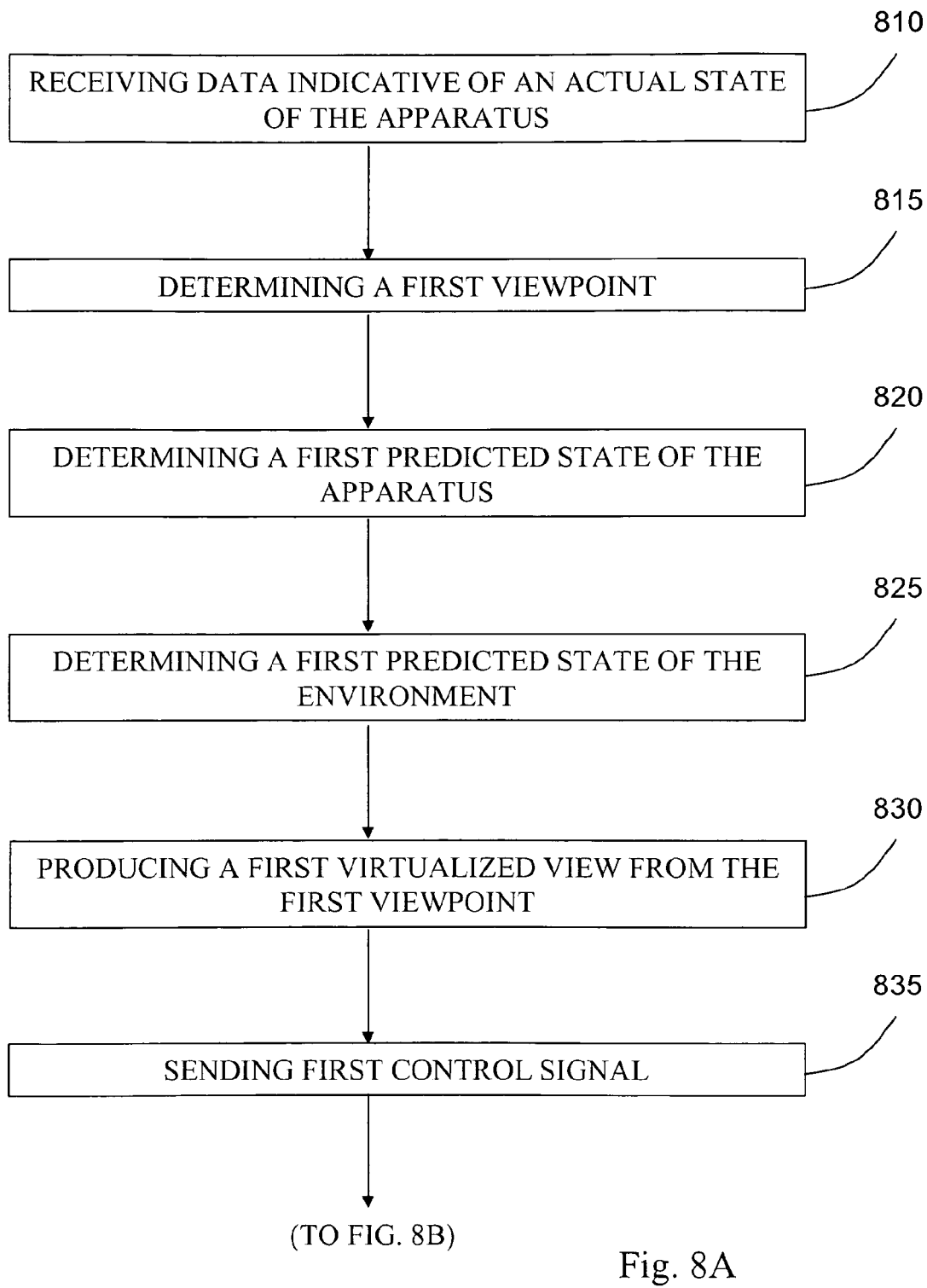
FIGS. 8A and 8B illustrate a method according to one embodiment of the present invention for controlling an apparatus in an environment 18.
Figure 8B:
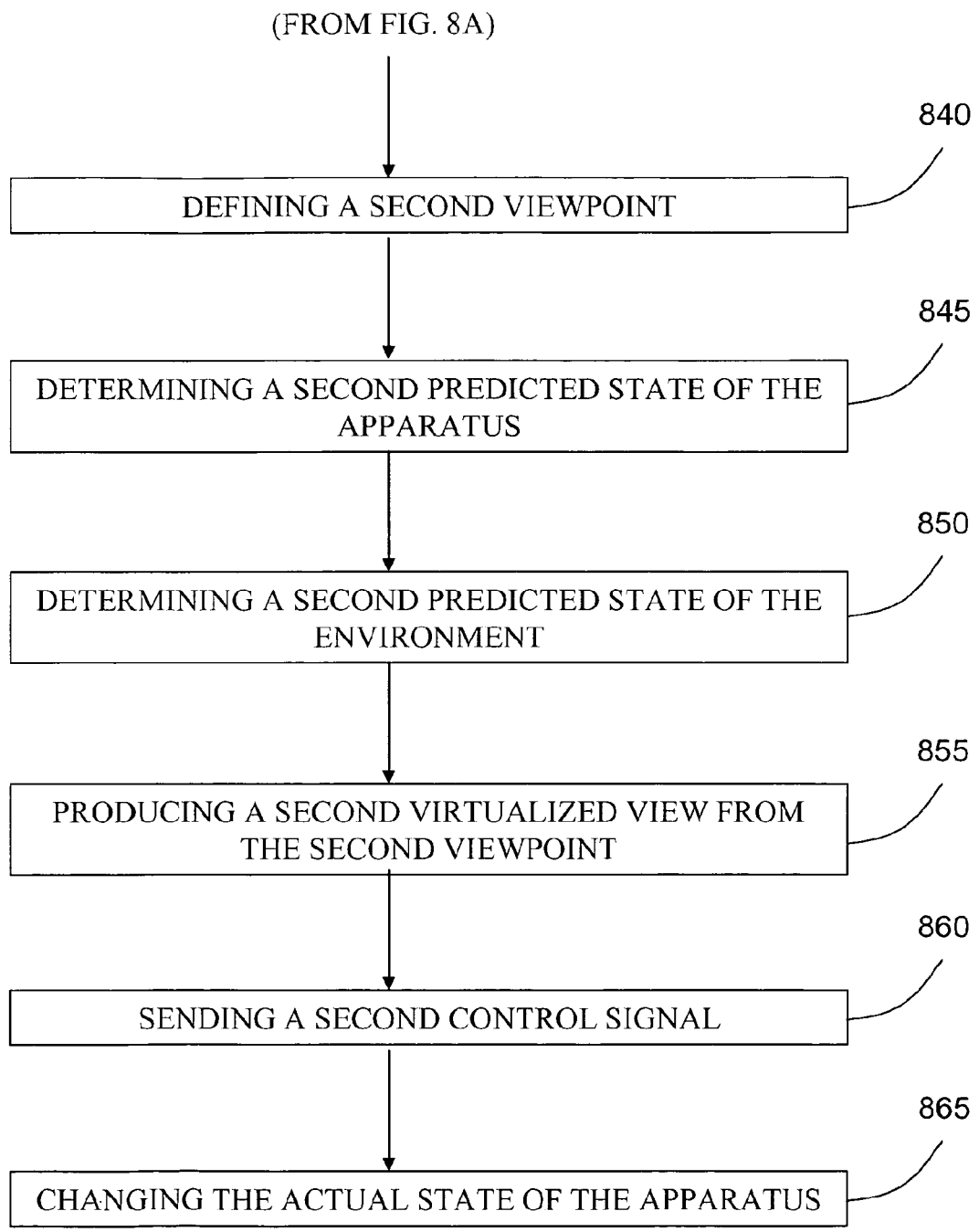

FIGS. 8A and 8B illustrate a method according to one embodiment of the present invention for controlling an apparatus in an environment 18.

Step 805 includes receiving data indicative of an actual state of the apparatus. This data may, for example, be received by the control agent 14 from the apparatus 12, or it may be received by the control agent 14 from some other source, such as from a database of data previously gathered by the apparatus 12, from a database of data previously gathered from some other source, or from other sources of data.

The state of the apparatus includes any and all information necessary or desirable in order to render an useful display of the apparatus and which permits an assessment of its relationship to the elements of its environment. State may include its position (x,y,z) in 3D space or its time derivatives as well as its orientation (roll, pitch, yaw) or its time derivatives. State may be represented with respect to any convenient datum in any convenient coordinates. If the apparatus articulates (changes shape) such as, for example, a crane or a mine shovel, then the state includes the angles, extensions, etc. of all articulations. When appearance or range cameras exist in the scene which can directly parts of the apparatus, then the apparatus state includes the appearance and geometry of the apparatus as imaged by such sensors as well as any other state that can be computed from them. Furthermore, environmental state includes any and all information necessary or desirable in order to render a useful display of the environment. Environment state includes the identity, positions and orientations of objects or elements, or their time derivatives. Environmental state also includes the appearance and geometry of all surfaces or elements in the environment. When the apparatus alters the state of the environment, apparatus state may come to include or exclude information about elements of the environment that become attached to or detached from the apparatus as part of its normal functioning. For example, if a crane lifts an object, of a shovel dumps a bucketful of dirt, then the apparatus state includes the configuration of the object lifted or the shape of the dirt in the bucket before it is dumped. Conversely, the environment state may include or exclude information about elements of the apparatus.

Step 810 includes defining a first viewpoint relative to at least one of the environment 18 and the apparatus. Defining can include, for example, defining three dimensional position, orientation, field of view, pixel resolution, projection rule, and modality. Defining a viewpoint defines the perspective from which the user views the apparatus and/or the environment 18. For example, the user may choose to define a viewpoint outside of the apparatus 12, such as above or beside the apparatus 12, so as to see both the apparatus and the environment 18. The user may also choose to define a viewpoint from within the apparatus, such as looking out though the front of the apparatus 12 to see what's ahead of the apparatus 12. Many viewpoints are possible. The viewpoint may move with the apparatus 12, such as by defining the viewpoint relative to the apparatus 12, or the viewpoint may be stationary, such as by defining the viewpoint relative to a location in the environment 18 so that the user views the apparatus 12 from a stationary point in the environment 18.

The view point may also be changed from time to time to suit the user or to accommodate other considerations. Also, the concept of viewpoint can be described using different terms, such as viewframe.

Step 820 includes determining a first predicted state of the apparatus at time T, wherein T is current time plus additional time representative of latency for a control signal to be received and implemented by the apparatus, and wherein the first predicted state of the apparatus is estimated from at least one previous actual state of the apparatus.

The latency for a control signal to get to the apparatus 12 can be calculated in different ways. In general, this is the latency between the control signal being initiated at the control agent 14 and the control signal being implemented by the apparatus 12. For example, this can be the time between a user providing an input at the control agent 14 that results in a control signal being sent to the apparatus (such as taking an action to cause the apparatus 12 to accelerate, brake, turn, follow a path, activate a sensor, send data, or take some other action), received by the apparatus 12, and the apparatus 12 implementing the control signal. The time at which the control signal is implemented may be well beyond the time that the control signal arrives at the apparatus.

The present invention does not require an exact determination of latency. Although more precise estimates of latency will generally provide for better results with the present invention, it is not necessary that latency be precisely determined for all situations. Advantages of the present invention can be realized in many situations with an approximation for latency. Furthermore, in some situations the latency will change or vary, such as when lines of communication 18 change, when the location of the apparatus 12 changes, when weather conditions change, when the operating condition of the apparatus 12 changes, and when other conditions change. Accordingly, as used herein the term "latency", discussions related to determining or estimating latency, and similar concepts related to latency do not require a constant and exact determination or measurement of latency.

This step predicts that state of the apparatus at a time in the future to compensate for latency in communication between the apparatus 12 and the control agent 14. In this way, the user sees a predicted state of the apparatus 12 and the environment 18 at a time in the future when control signals sent by the user will be received and implemented by the apparatus 12. In contrast, if the user saw the apparatus 12 and the environment 18 at a state in which they were predicted to be at the present time, then control signals sent to the apparatus would still exhibit latency caused by the delay in sending the control signals from the control agent 14 to the apparatus 12 and the apparatus 12 would still exhibit latency in implementing the control signal 14. The present invention can compensate for this latency by determining a predicted state of the apparatus at a time in the future corresponding to the estimated latency for a control signal to be received and implemented by the apparatus.

Step 825 includes determining a first predicted state of the environment 18 at time T. As described above with regard to determining a first predicted state of the apparatus in step 820, the present invention determines the state of the environment 18 at a time in the future to compensate for latency.

Step 830 includes producing a first virtualized view from the first viewpoint, wherein the first virtualized view uses encoded data, wherein the first virtualized view is indicative of both the first predicted state of the apparatus 12 at time T and the first predicted state of the environment 18 at time T. The present invention produces a virtualized view from the viewpoint defined above in step 815. From this viewpoint, the present invention produces a virtualized view, meaning that the view is not entirely represented by the most recent actual images captured by cameras or other sensors 24. As discussed above, the present invention determines predictive states of the apparatus 12 and the environment 18, and the virtualized view is produced with reference to this predictive state in order to show the apparatus 12 and the environment 18 at a time in the future to compensate for latency. As described in more detail herein, the encoded data may be produced from data gathered by the apparatus 12 or from other sources, and step 830 may also include retrieving the encoded data from a database such as the memory devices 22, 42 in the apparatus 12 and the control agent 14.

The virtualized view can be based on any combination of the most recent image, the most recent states, all images and states received up to that time and any other relevant information conveyed to the system by mechanisms other than the sensors. For example, the virtualized view may include a box of the right size moving over a Google maps image. In that example, no "elements" here are real but the apparatus state is used to make it move on the screen. This includes no real elements but merely repositions encoded data. Another example is a fake looking, uniformly brown, computer generated vehicle, moving in a virtualized world that looks very real. Another example is a good looking vehicle that looks good because the required textures were taken by a digital camera last month and stored in the computer, computed with real-time video feeds of the environment. Another example is an out the window view of real video which is corrected only for geometric distortion. This has no encoded data elements in it. The present invention is not limited to these examples, and other embodiments of the present invention are also possible.

The virtualized view may, for example, be created by taking actual images captured by sensors 24 in the apparatus 12 and placing those images into a computer generated landscape. Alternatively, an actual image of the landscape may be populated with computer generated images from data gathered by the sensors 24 or from other data. In other embodiments, the entire image may be computer generated images. Many variations and combinations of real and computer generated images are possible for the virtualized view.

The virtualized view also uses encoded data which is indicative of the environment 18, or indicative of at least portions of the environment 18. The encoded data is produced from data which is collected, encoded, and thereafter used to produce computer generated images for the virtualized view. For example, the encoded data may be a product of images captured by sensors 24 on the apparatus 12, or the encoded data may be the product of images and data collected by the apparatus 12 or by some other process at an earlier time, and then encoded and stored in a database until used by the control agent 14. Examples of sources for encoded data are data from satellites, data gathered previously by the apparatus 12, data gathered from other apparatus or people, and any other source of data which is indicative of the environment 18. The encoding of the data is described in more detail with regard to FIGS. 3 and 5 as well as other parts herein.

Step 835 includes sending a first control signal to the apparatus 12 after producing the first virtualized view. In other words, a user can view the first virtualized view, which is produced based on predicted future states of the apparatus 12 and the environment 18, and then the user can decide which control signals to send to the apparatus 12 based on these predicted future states of the apparatus and environment 18. As a result, decisions can be made and control signals sent to the apparatus 12 before the apparatus and the environment 18 have reached the actual state that the user sees in the virtualized view.

Step 840 includes defining a second viewpoint relative to at least one of the apparatus and the environment 18, wherein defining a second viewpoint occurs after defining a first viewpoint. As described above, the viewpoint can be defined by a number of parameters, the viewpoint can be within the apparatus 12 or outside of the apparatus 12, and the viewpoint can be stationary with respect to the environment or it can move with the apparatus 12. The viewpoint can also change from time to time.

The second viewpoint may be the same as the first viewpoint, or it may be different. For example, if the first viewpoint is defined relative to the apparatus 12 and the apparatus is moving, then the location of the second viewpoint will change relative to the environment 18 in order to maintain the predefined relationship with the apparatus. In other situations, the first and second viewpoints may change for other reasons, such as if it is desired to change the viewpoint in order to gather different or additional information about the environment 18 or the apparatus 12. In other situations, the first and second viewpoints may be the same, such as if the apparatus 12 has not moved or if the viewpoint is defined as being stationary with respect to the environment.

Step 845 includes determining a second predicted state of the apparatus at time T+delta T. Delta T is a difference in a time between displaying the first virtualized view and a second virtualized view. The second predicted state of the apparatus is also estimated from at least one previous actual state of the apparatus and from at least one previous control signal to the apparatus. The state of the environment may be used not only for visualization but also for prediction. The second predicted state of the apparatus may also be estimated based on interactions between the apparatus and environment such as, for example, predicting the manner in which a wheeled vehicle state, particularly its attitude and elevation, changes as it rolls over uneven terrain, or predicting the manner in which hole will appear in the terrain and dirt will appear in a shovel, when a shovel scoops a load of dirt. In other words, the second predicted state of the apparatus 12 may be estimated from at least one of predicted state of the environment 18. In particular, the second predicted state of the apparatus 12 may, for example, be estimated from the geometry of at least one predicted state of the environment 18. Other aspects of the environment may also be used to estimate the second predicted state of the apparatus 12. Furthermore, these methods are not limited to only the second predicted state of the apparatus 12.

Delta T is used to adjust for the refresh rate of the virtualized view. For example, if the virtualized view is presented at sixty frames per second, then there is 1/60th of a second between each frame (or each virtualized view). As a result, this time interval will affect the predicted states of the apparatus 12 and the environment 18 in at least some situations. For example, if it is known that the apparatus 12 is traveling at a constant six meters per second in a straight line on flat, level terrain, and the virtualized view is presented at sixty frames per second, then in each successive frame (or each successive virtualized view) it may be predicted that the apparatus has moved another 0.1 meters.

The second predicted state of the apparatus 12 is also estimated from previous actual states of the apparatus and from previous control signals to the apparatus. In other words, data indicative of previous actual states of the apparatus 12 (data indicative of the actual states as opposed to predicted states) is used to determine the second and other predicted states. This data of actual states provides a check on the predicted states and offers opportunities to make corrections and update predicted states to reflect actual events. The second and other predicted states are also determined with reference to previous control signals. For example, if data indicative of an actual state of the apparatus indicates a particular location and velocity, and a subsequent control signal changes the velocity, then that previous control signal (and other control signals) can be used to determine the second and other predicted states.

Step 850 includes determining a second predicted state of the environment 18 at time T+delta T. As described above with regard to determining a second predicted state of the apparatus in step 845, the present invention determines the state of the environment 18 at a time in the future.

Step 855 includes producing the second virtualized view from the second viewpoint, wherein the second virtualized view uses encoded data, and wherein the second virtualized view is indicative of both the second predicted state of the apparatus 12 at time T+delta T and the second predicted state of the environment 18 at time T+delta T. The present invention can produce many virtualized views in order, for example, to provide video or other representations of an apparatus 12 and an environment 18. The second virtualized view may be one of a series of virtualized views that are indicative of predicted states of the apparatus 12 and environment 18 at times in the future. These virtualized views may be produced in quick succession and at a rate so as to simulate a live video representation of the apparatus 12 and environment 18, or they may be produced at a rate that does not simulate live video, but which is nonetheless useful in particular applications. As described in more detail herein, the encoded data may be produced from data gathered by the apparatus 12 or from other sources, and step 855 may also include retrieving the encoded data from a database such as the memory devices 22, 42 in the apparatus 12 and the control agent 14.

Step 860 includes sending a second control signal to the apparatus after producing the second virtualized view. The present invention allows for one or many control signals to be sent to the apparatus 12. The second control signal is indicative of such a control signal but the present invention is not limited to only a first and second control signal and many or few control signals may be sent to the apparatus 12. The "first" and "second" control signals are representative of two such control signals although additional control signals may be present in the same or similar form to that described with regard to the first and second control signals.

Step 865 includes changing the actual state of the apparatus based on the first control. The purpose of control signals is to change the actual state of the apparatus 12 such as by changing position, orientation, velocity, curvature, or some other action or activity of the apparatus 12. Control signals can also change the state of the apparatus 12 by changing a sensor 24 (e.g., turning a sensor on or off, change the orientation of a senor, or otherwise changing a sensor), changing the rate or kind of data being transmitted from the apparatus 12 to the control agent 14, or to otherwise change the state of the apparatus 12.

The first and second control signals may contain different types and different forms of data. For example, the first and second control signals may include control signals specifying movement and direction commands to be implemented by the apparatus 12. These may be, for example, control signals telling the apparatus to turn left five degrees, to increase velocity by three meters per second, to turn a sensor five degrees upward, of other commands. The first and second control signals may also include control signals in other formats. For example, the control signals may specify a position and orientation to be achieved by the apparatus 12 at a time in the future. For example, the control signals may specify that the apparatus 12 reach a particular GPS coordinate and achieve a particular orientation at that coordinate at a particular time, and the apparatus 12 determined the particular changes to its orientation, velocity, and other characteristics required to achieve the specified position and orientation at the specified time. In one embodiment, the control agent produces periodic (e.g., once per second) control signals which specify position and orientation based on the inputs from the operator at the control agent 14.

The control signals may also take other forms. For example, the control signals may be "encoded data". For example, once a path for an apparatus 12 (such as a mine truck in an open pit mine) is driven once, that path can be encoded (such as with GPS) and the encoded data can be saved and re-used. In this way, the virtualized display can be used to to "teach" an apparatus 12 off-line to execute the same control signals one time or many times. This is important because a remote operator might never need to visit the environment 18 in which the apparatus 12 operates (such as an open pit mine, a war zone, or a construction site) and the operator could control many apparatuses 12 by teaching each of the apparatuses 12 how to operate itself for particular tasks and environments.

Other modifications and variations are also possible with the present invention.

Figure 9:
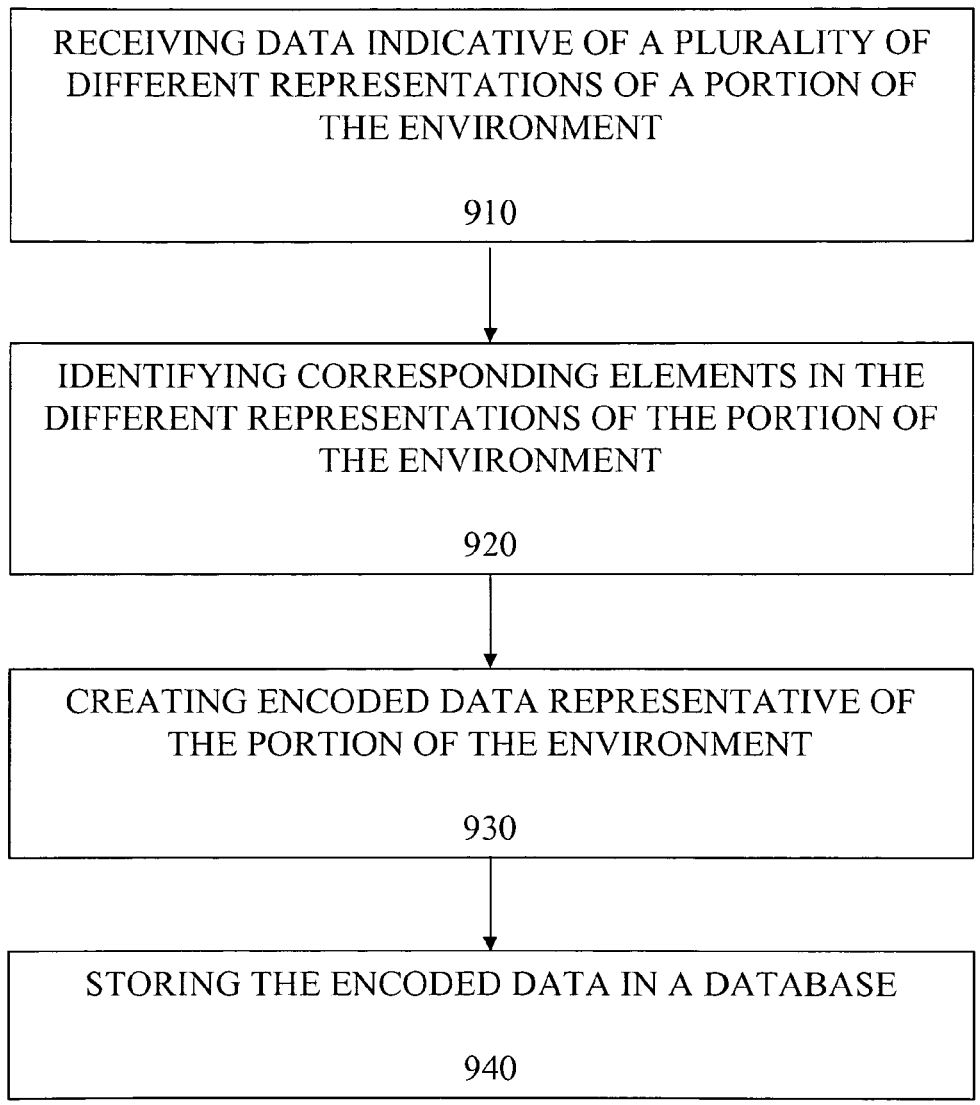
FIG. 9 illustrates one embodiment of a method for producing encoded data according to the present invention

FIG. 9 illustrates one embodiment of a method for producing encoded data according to the present invention. The method of producing encoded data may be used to produce encoded data used with the present invention such as described with reference to FIGS. 8A and 8B.

Step 910 includes receiving data indicative of a plurality of different representations of a portion of the environment 18. In particular, a portion of the environment 18, such as a building, a tree, a road, a mountain in the distance, or other portions of the environment may be represented as data. This data may be captured, for example from a camera 24 on the apparatus 12 or in some other fashion. If two or more different representations of the same portion of the environment are available, that portion of the environment 18 may be represented as encoded data and used according to the present invention.

Step 910 may be performed with one or more sensors 24 on the apparatus 12. For example, step 910 may be performed as the apparatus 12 is moving through the environment 18 and the data from step 910 may be used as it is being gathered (or shortly thereafter). The present invention may also be embodied in other ways. For example, the data for step 910 may be gathered by a person on foot who is holding a sensor 24, an apparatus carrying a sensor 24, a satellite with a sensor 24, or otherwise. This data may be processed as described herein and used by the apparatus 12 at a later time.

Step 920 includes identifying corresponding elements in the different representations of the portion of the environment 18. In other words, the same element captured in different representations of the same portion of the environment 18 can be identified. Once the corresponding elements are identified in different representations of the same portion of the environment, that portion of the environment may be at least partially be represented as encoded data.

For example, if a building is viewed from two or more different angles, corresponding or common elements in the different view of the building may be identified, such as identifying a chimney that is visible from the several different views. Identifying the same chimney in two or more different views of the building is an example of corresponding an element in the different representations.

Step 930 includes creating encoded data representative of the portion of the environment 18. To continue with the example above with regard to identifying a chimney in two or more different views of a building, encoded data of the building can be created by using the images of the building and relating the corresponding elements together to create encoded data that represents the building. For example, if there are two images of the building, those images can be used to create a partial three dimensional representation of the building with the chimney used to orient the different images of the building into a proper three dimensional representation.

The encoded data is not necessarily a complete representation of a portion of the environment, but an incomplete representation may still produce a useful visualization of the environment 18.

Step 930 may encode the data in many different ways. For example, data representative of the appearance of a portion of the apparatus 12 or the environment 18 may be encoded to make those portions of the apparatus 12 or the environment 18 appear non-photorealistic. In other words, portions of the environment 18 or the apparatus 12 may be made to look different from their actual appearance by encoding the data to display that portion of the apparatus 12 or the environment 18 in a false color to represent additional information about the apparatus 12 or environment 18. This may be done to help a user operate the apparatus 12. For example, a portion of the ground that is brown or green in reality may be colored red to indicate that the apparatus 12 should not drive in that area. Similarly, a portion of the apparatus 12 that is damaged may be made to appear a different color than normal (e.g., red or yellow) to indicate the possible damage. The present invention may utilize algorithms that assess the terrain of the environment 18 or other factors to determine whether and how to provide this additional information.

The present invention may also display information that would not normally be visible to the unaided human eye. For example, data indicative of appearance may be encoded to display information from the infrared or ultraviolet portions of the spectrum, or to display information from other portions of the electromagnetic spectrum or from other forms of gathering data. In one embodiment, displaying infrared data at a visible wavelength can be used to aid in night time or other low light applications. Similarly, appearance data can be amplified, either amplified uniformly or amplified selectively, to provide better visibility in low light conditions and for other purposes.

Step 940 includes storing the encoded data in database. The database may be, for example, one or more of the memory devices 22, 42 in the apparatus 12 and control agent 14. The encoded data may also be stored in other databases, such as memory device separate from the apparatus 12 and the control agent 14, and the encoded data may be moved the memory devices 22, 42 in the apparatus 12 and the control agent 14 at a later time when it is anticipated that the encoded data may be needed.

Many variations are possible with this aspect of the present invention. For example, creating 930 encoded data may include encoding appearance and geometry of the portion of the environment 18. In other words, the encoded data may represent both geometry and the appearance of the portion of the environment 18 or that apparatus 12. The geometry represented by the encoded data may be two-dimensional geometry or three-dimensional geometry. In some situations, the encoded data may represent one-dimensional geometry, such as in the case of a portion of the element that is far from the viewpoint of the user, such as a distant road.

As described above, the encoded data may come from a variety of sources. For example, the encoded data may be produced with data from sensors 24 on the apparatus 12. The encoded data may also be produced with data from a sensor that is not on the apparatus 12, such as a sensor on a different apparatus or in the environment. Data may be gathered, for example, from satellite data, from cameras not associated with the apparatus 12, or from other sources. The encoded data may also be retrieved from a database, such as in the case where the encoded data is produced far in advance of being used by the apparatus 12, and that encoded data is stored in a computer-readable memory 22, 42 for use when needed at a later time.

The methods described with regard to FIGS. 6, 7, 8A and 8B, and 9, as well as other methods described herein, may be implemented, for example, by the apparatus 12 and control agent 14 described with reference to FIGS. 1 and 2 as well as by other embodiments of the present invention described herein. For example, the methods may be embodied as computer-readable instructions that are stored in the memory devices 22, 42 of the apparatus 12 and control agent 14. The computer-readable instructions may be stored in one of the memory devices 22, 42, or it may be stored in both memory device 22, 42, or a portion may be stored in one memory device 22 and different portion may be stored in another memory device 42. Similarly, the processors 20, 40 in the apparatus 12 and control agent 14 may execute the computer readable-instructions and other instructions in order to perform the method described herein. Those and other variations are possible with the present invention, both with regard to the method described in FIGS. 8A and 8B, and with regard to other teachings of the present invention.

The present invention has generally been described in terms of compensating for latency related to data received from the apparatus 12 and control signals sent to the apparatus 12. However, the present invention also includes other variations and embodiments. For example, once latency is defined to include the time for controls to be implemented by the apparatus 12, there is a possibility that this time may be much later than when the control signal arrives at the apparatus 12. Hence, the operator/control agent 14 in this scenario views a predictive display that predicts state by two increments into the future: one is for time required for the communication or control signal to reach the apparatus 12 and the second is for the implementation of the control signal by the apparatus 12.

If an operator 14 is allowed to tell an apparatus 12 what to do in the future, better performance may be realized if the operator 14 tells the apparatus 12 where to go at a specified time rather than how to steer and how fast to go along the path. Mathematically, position and orientation are integrals of velocity and curvature (gas pedal and steering wheel). Hence better results may be achieved by controlling the apparatus 12 (for example, driving a vehicle as usual with steering and gas pedal) without sending the steering and gas as control signals. Rather the path (or, for example, the change in position or orientation for a non-mobile apparatus) to be followed by the apparatus is sent to the apparatus 12 and it is the responsibility of the apparatus 12 to follow that path (or to achieve the desired position or orientation).

This embodiment of the present invention is better able to reject disturbances for two reasons. First, this embodiment provides the apparatus 12 with time to look ahead (it can "see into the future" where the operator 14 wants it to go). Second, the apparatus 12 can compensate for position errors to stay precisely on the path desired by the operator 14. As a practical matter, due to issues like wheel slip, it is not the case that an apparatus 12 that follows the curvature and speed specified by an operator 14 will actually stay on the path directed by the operator 14.

The present invention may be embodied such that the final destination and arrival time are provided to the apparatus 12, or the invention may be embodiment such that one or more intermediate locations and times are provided for the apparatus 12 along the path to the final destination. Other variations are also possible, some of which are identified below.

In one embodiment, the apparatus 12 becomes wholly or partially responsible for compensating for errors in the state prediction process by actively seeking to reduce such errors in order to function as the operator intended whether the state predictions were perfectly accurate or not.

In another embodiment, environment relative control signals such as, for example, the position and orientation of the apparatus 12 expressed as functions of time or distance, are derived from the natural control signals of the apparatus 12 issued by an operator 14 (for example curvature and fuel flow rate) and these derived signals are sent to the apparatus 12 as control signals.

In another embodiment, the virtualized display is used assist an operator 14 in specifying environment relative control signals by allowing the operator 14 to visualize the relationship of the apparatus to its environment 18 at any convenient time.

In another embodiment, the control signal is specified well into the future beyond the time of arrival of the control signal at the apparatus 12 so that the apparatus 12 may implement automatic control techniques to minimize integrated following error in a predictive and/or optimal control fashion.

The present invention allows for other embodiments and variations. The following are supported by the present invention.

For example, if there are errors in prediction (meaning the control signals, if all were known, would not cause the apparatus 12 to function as predicted), and the prediction is in the real future, then they have not happened yet. If so, the prediction problem can be redefined to require the apparatus 12 to track the incorrect predictions in order to make them more correct. If it is predicted that the vehicle 12 will go straight three seconds from now, and the vehicle 12 finds itself drifting right due to wheel slip, the vehicle 12 can turn slightly left in order to go straight.

In another embodiment, if an operator 14 pre-drives a vehicle, the intended path is known in the future. If that is so, the present invention can utilize a path following algorithm. The path following algorithm may be implemented, for example, in the processor 20, in the apparatus controller 26, or otherwise.

In another embodiment, a simple way to have the operator 14 specify a future path is to use the path that is specified by the values of apparatus predicted states that happen to be future relative to the time of arrival at the apparatus 12.

In another embodiment, whether the control signal is converted to a path or not, knowing its future value permits more effective apparatus control.

Other variations and modifications of the present invention are also possible. The present invention will now be described in terms of more specific embodiments.

1 Introduction to Additional Embodiments

The following is a description of a particular embodiment of the present invention referred to as the Situational Awareness with Colorized Ranging (SACR) system 10. This embodiment is illustrative of the present invention, but the present invention is not limited to this embodiment.

The goal of the SACR system 10 is to improve situational awareness, safety, and performance when commanding, driving, or navigating apparatus via indirect or remote driving. The SACR system 10 is built around a Video Ranging Module (VRM) 24, a sensor capable of producing real-time, co-registered video and range data. Using the data from this sensor 24 to build models of the world, the SACR system 10 not only provides an increased field of view, but can even compensate for latency inherent in standard teleoperation system. The SACR system 10 can also provide video to multiple operators with independent, movable viewpoints, allowing each operator to choose viewpoints or camera motions that better convey the situation around the apparatus 12 for his purposes.

There are three parts to the Phase I SACR system 10: (1) a bench-top prototype of the Video Range Module (VRM) 24, (2) processing algorithms to generate synthetic video, and (3) simulation tools for VRM simulation and indirect/remote driving. The early sections of this description provide a conceptual system 10 that integrates items (1) and (2) in a closed-loop SACR-enhanced indirect/remote driving system 10. Item (3) is the Phase I conceptualization of such a system. Later sections of the document capture the design of each of the three items, and include a description of a more detailed near-term system design.

1.1 Terminology

Three application-specific terms occur frequently in this document: direct driving (normal driving), indirect driving, and remote driving (teleoperation). Direct driving is a vehicle motion control approach in which a soldier/driver sits in the driven vehicle, directly perceives the situation around the vehicle by looking through real windows on the vehicle, and uses common controls such as throttle and brake pedals and a steering wheel. Indirect driving is a related approach that replaces real windows with "virtual" windows—video displays fed by cameras mounted on the exterior of the vehicle—but with the driver still inside the controlled vehicle. Remote driving, or teleoperation, is a driving approach that separates the vehicle from the driver. The driver uses virtual windows, with video transmitted over a (usually wireless) communications system to a driver interface device, and uses that device to send control signals.

1.2 Goal Statement

The SACR system 10 is targeted at improving driving performance and situational awareness during indirect driving and teleoperation. The system 10 will be useful in varying terrain, including roads, trails, and unstructured off-road environments 18. In the description of this embodiment, the driving environment 18 is assumed to be static, while allowing for the movement of foliage and the limited movement of natural elements such as sand, gravel, and clouds. It is assumed that the vehicle 12 contains at least one forward-facing VRM 24 that may or may not be positioned at the ideal viewpoint for driving. Additional VRMs 24 and cameras 24, if available, can be used to improve the quality of the world modeling.

1.3 System Requirements

The system 10 functional requirements capture many requirements with significant design influence and are reproduced in Section 5 below. Condensing these requirements into a single statement, the main objective for the SACR project is to generate video for remote driving and indirect driving that compensates for latencies in the system 10 and that allows multiple users to independently alter their viewpoints. As the material in Sections 2-4 will reveal, the preliminary design directly addresses each of these requirements.

1.4 Overview

The SACR system 10 will combine VRM data with COTS pose estimation technology to produce a 3-D model of the environment 18. As outlined in Section 2, Design Concept, and described in more detail in Section 3. Phase I System Design, this model can be used to produce 3-D imagery from virtual viewpoints. Combined with models of vehicle motion prediction, the latency in these images will appear to be lower than latency in standard teleoperation systems today. Moreover, these virtual viewpoints need not correspond precisely with any real camera 24, offering users wider fields of view and independent, movable viewpoints. This embodiment describes a system design concept (Phase I) but was created to accommodate work done during all stages of the program. References will be made to three "phases" of the system 10 described herein. Broadly speaking, Phase I focuses on developing a bench-top prototype of a VRM, processing algorithms to transform VRM data into synthetic video, and software simulations both to support algorithm development and to provide closed-loop simulations of indirect and remote driving. Phase II will include building a full closed-loop SACR-enhanced remote operations system 10 on a real vehicle 12, in which this system design will be formed into a working system 10. Section 4, Proposed Phase II System Design, contains a specific engineering design for a complete, end-to-end, human-in-the-loop SACR-enhanced teleop control system. This design is based on the most reliable information developed from Phase I work, and represents an "engineering space" approach to developing such a capability. Phase II will continue to explore more speculative research topics than this more cautious engineering design embodies, to aggressively push the envelope of technical capabilities, but the engineering design has the benefit of being concrete and feasible with only an engineering effort. Finally, though this is fundamentally a research project, it is still important that the designs and implementations are consistent with program goals and requirements. Section 5, Requirements Tracking and Compliance, describes how the design satisfies the requirements.

2 Design Concept

This section presents a high-level conceptual overview of the SACR system 10. This discussion is intended to quickly provide overall context into the SACR approach. By doing so, it provides the overarching framework needed to understand how Phase I activities relate to the whole. Section 3, Phase I System Design, presents the Phase I design of several subsystems as well as the simulation system, all of which derive from this overview.

2.1 System Overview

Figure 10:
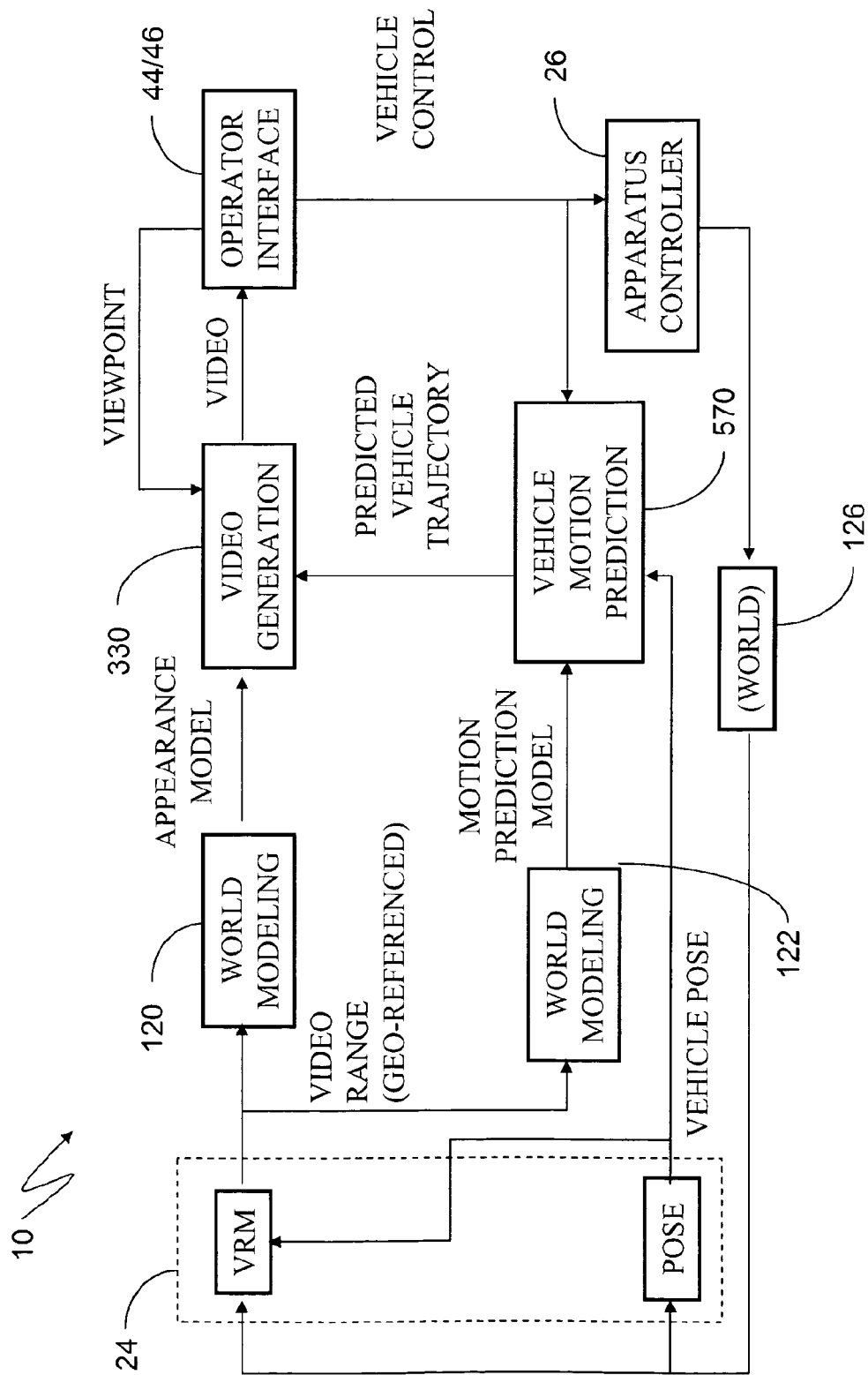
FIG. 10 illustrates a high-level block diagram of one embodiment of a system according to the present invention.

FIG. 10 illustrates a high-level block diagram that captures the major logical functions of the SACR system 10. In this embodiment, the sensors 24 include a VRM sensor suite and a Pose estimation sensor suite. The SACR system 10 is driven by measurements made by the VRM sensor suite 24 and the Pose estimation sensor suite 24. The data from these sensors 24 is fused into two models of the environment 18: an appearance model produced by module 120 and a motion prediction model produced by module 122. These modules 120 and 122 may be, for example, part of the vehicle prediction module 420 illustrated in FIGS. 4 and 5 and may be used, for example, in conjunction with the rendering database 320 and the terrain database 560, respectively, in FIG. 5. A vehicle motion prediction module 570 is used to compensate for latency in VRM and Pose data, producing the anticipated motion of the platform 12 for a short time into the future. A video generation module 330 uses the appearance model to create synthetic video from the anticipated location of the vehicle 12 at the time the image will be presented to the user, compensating for the effects of appearance model and pose latency. The video is shown to the operator on an interface device 44/46, which allows the operator to change viewpoints and to send driving commands to the vehicle 12.

2.2 Pose Module

The Pose module 24 uses multiple sensors and software processing to determine the location of the vehicle 12 and the sensors 24 over time. The sensor suite 24 includes a combination of sensors like GPS, IMU, tilt sensors, wheel encoders, and steering wheel encoders, all of which would be mounted directly to the vehicle 12.

Note that these sensors are commonly available on many military ground vehicles already, so there is significant opportunity for eliminating the SACR pose sensors 24 during integration with target platforms 12.

2.3 Video Range Module (VRM)

The VRM 24 has been developed over the last five years as parts of other projects. Based upon a laser rangefinder module and a video camera module, this sensor 24 registers the data from the two modules and provides the user with a stream of co-registered "colorized range." The position of each point in this stream is known relative to the pose of the vehicle 12 at the time it was captured. The VRM receives the vehicle 12 location in the world from the Pose module, allowing the VRM to also tag each VRM measurement with location in the world.

Note that video and range sensors 24 are common elements of most autonomous systems being developed today (e.g., Urban Challenge teams, DARPA UPI project), so there is significant opportunity for eliminating these SACR sensors 24 during integration with target platforms 12, too.

2.4 Appearance Model Generation Module

The Appearance Model Generation module 120 uses the VRM 24 data to produce the Appearance Model, a 3-D visual model of the environment 18 around the vehicle 12. This model is used by the Video Generation module 330 to produce the video observed by the operator. For example, suppose a vehicle 12 is being driven through a meadow with tall grass. The appearance world model attempts to capture the appearance of grass, even though the wheels of the vehicle 12 usually "sink" below the top of the grass.

2.5 Motion Prediction Model Generation Module

The Motion Prediction Model Generation module 122 uses the VRM data to construct a world model appropriate for vehicle motion prediction—the Motion Prediction Model. This model captures as much as is known about the factors in the world that influence how the vehicle 12 will mechanically interact with the world, rather than how it looks to the human eye. For example, suppose a vehicle 12 is being driven through a meadow with tall grass. The motion prediction world model captures the system's 10 best estimate of the surface that will support the vehicle 12, which is usually well below the "visual" surface across the top of the grass. The motion prediction model may be eliminated from the system 10 if, for example, latency compensation is not being employed.

2.6 Vehicle Motion Prediction Module

The Vehicle Motion Prediction module 570 uses the Motion Prediction Model to predict where the vehicle 12 will be in the future. Predicting slightly into the future allows the system 10 to compensate for latency in getting sensory data to the operator and for latency in getting driving commands back to the vehicle 12. Accordingly, the Vehicle Motion Prediction module 570 may include a latency prediction module 410 (not shown) or receive data from a latency prediction module 410 (not shown), such as that described above with regard to FIGS. 4 and 5. The Vehicle Motion Prediction module 570 also uses the pose data from the Pose component 24 to get the most recent measurement of Vehicle Pose—data that is expected to be available with much lower latency than the motion model because the data is very low bandwidth. Using the most current pose data reduces the amount of time for which Vehicle Motion Prediction module 570 must compensate.

2.7 Video Generation Module

The Video Generation module 330 uses three main inputs to generate a video for display to the operator: the Appearance Model, the Predicted Vehicle Trajectory, and the (operator-selectable) Viewpoint. Logically, each user's view can be calculated using a simple rigid transformation of a 3-D model, potentially using COTS graphics hardware to perform a standard rendering operation. However, any given model may contain conflicting information or gaps in information, which often leads to confusing or even misleading displays for the operator. It is conceivable to attack these problems at the model generation stage, the video generation stage, or both stages—which therefore influences data compression and transmission. This document captures Phase I design on this topic, though it is expected that Phase II work will continue explore this problem.

2.8 Operator Interface Module

The Operator Interlace module 44/46 provides three capabilities to the user: it displays the video to the operator, it gives the operator ways to change the viewpoint, and it gives the operator driving controls to drive the vehicle 12. This module 44/46 is not a focus of attention for SACR Phase I: good interface design usually involves extensive user testing to determine optimal interfaces, which is beyond the scope of the effort. Still, a basic version is needed to develop and test the rest of the system 10. The interface 44/46 is primarily focused on showing technical capabilities, demonstrating the various features but not optimized for usability.

2.9 Vehicle Controller and World

The Vehicle Controller 26 and the World 126 live outside the scope of SACR, but are integral elements of the driving control loop. Vehicle Controller 26 is a logical component representing the control system onboard the vehicle that takes driving commands (throttle, braking, steering) and translates those into appropriate vehicle 12 motion. In reality, this component might contain many subsystems, but for clarity we group them all into this one logical element 26. World 126 is a logical component representing all the physics of the world, from vehicle 12 dynamics and terrain-tire interactions to the interactions of photons of light with the world and with electromagnetic sensors.

3 Phase I System Designs

For Phase I, the SACR project scope was to develop (1) a bench-top prototype of the Video Range Module (VRM) 24, (2) processing algorithms to generate synthetic video, and (3) simulation tools for VRM simulation and indirect/remote driving. The sections below describe the design of each system. Note that for Phase I, each of these efforts should be considered a standalone system. In Phase II, these concepts will be integrated into a full closed-loop, SACR-enhanced remote operation system 10.

3.1 Design of the Video Range Module (VRM) Prototype

The Video Range Module (VRM) 24 is an integrated set of hardware components used to create coregistered, time-synchronized color range data. The high-level VRM 24 design includes support for the integration of data from range sensors, video cameras, and other sensors such as IR cameras.

During Phase I, we refined this high level design down to a detailed design for a flexible development platform. This design accommodates real-time high-fidelity and high-capacity data logging while also providing a high performance embedded computer for future onboard processing. The system can operate as a standalone unit including built-in pose estimation as well as perception sensors, requiring only two interfaces to the platform: power (6 A at 24 VDC) and wheel odometry.

Figure 11:
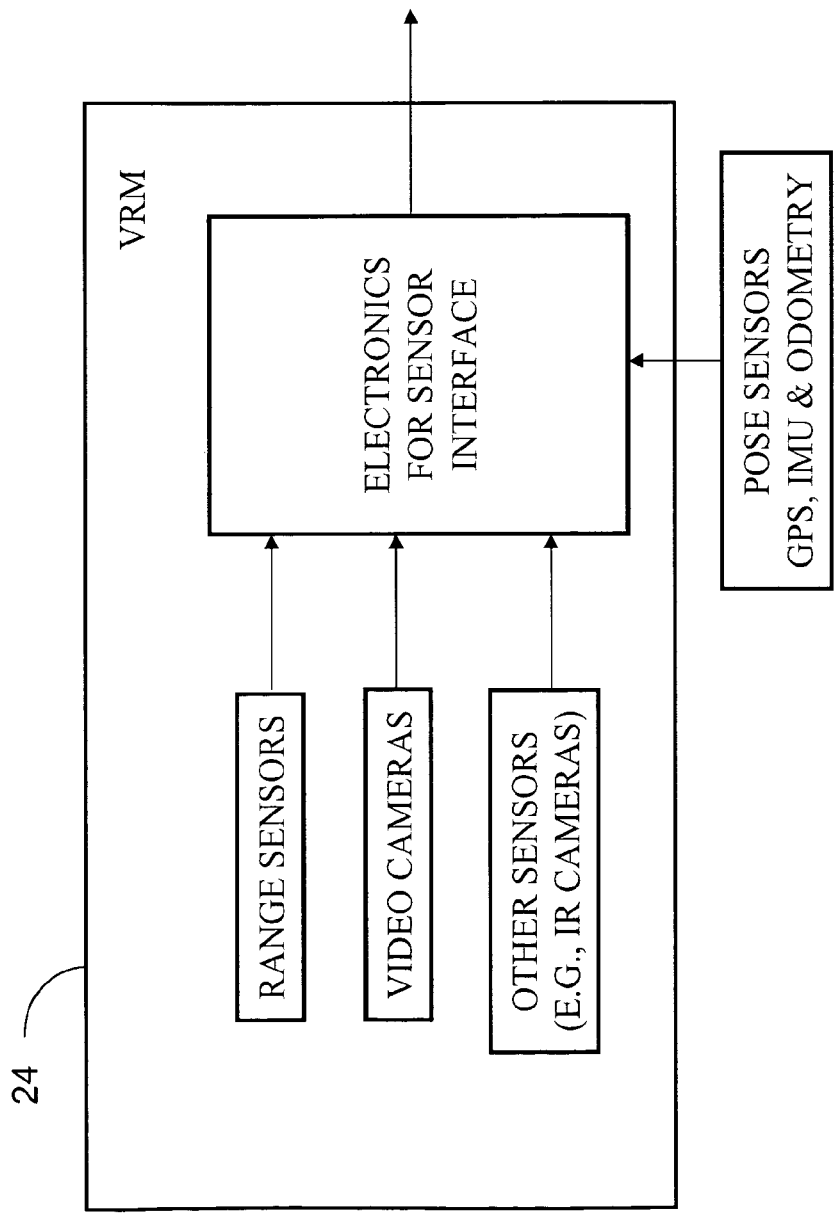
FIG. 11 illustrates a high-level VRM design including support for the integration of data from range sensors, video cameras, and other sensors such as infrared cameras.
Figure 12:
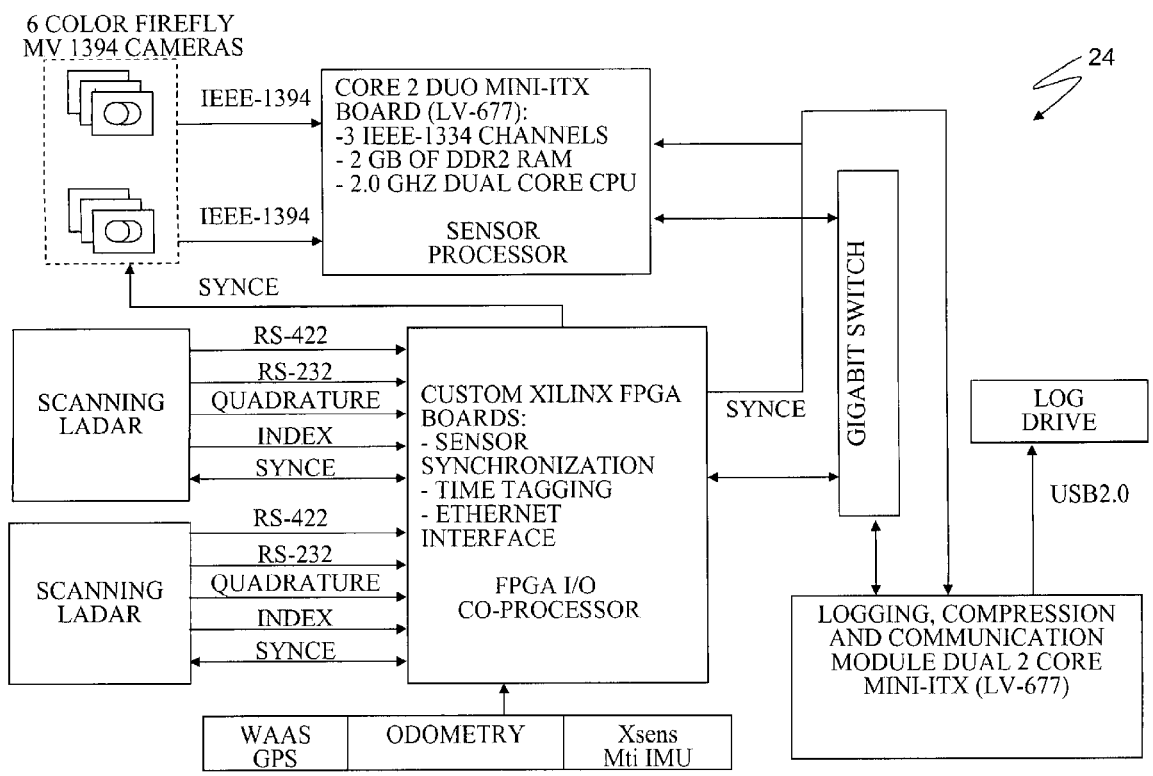
FIG. 12 illustrates a one embodiment of a design for a flexible development platform.

The design illustrated in FIG. 12 was used to build two versions of the sensor pod 24, one forward-looking and one omnidirectional (panoramic). The forward looking pod 24, primarily focused on driving, contains one SICK ladar, one PtGrey Bumblebee 2 camera pair, and one FLIR camera, as well as Garmin WAAS GPS, Xsens Mti 6-DOF IMU, wheel odometry. The actual unit is shown in FIGS. 11a and 11b.

With it's panoramic view, the omnidirectional pod 24 is primarily focused on around-the-vehicle situational awareness, especially important if an operator feels lost. This pod 24 contains one SICK ladar and six PtGrey Firefly MV Cameras. The actual unit is shown in FIGS. 12a and 12b.

3.1.1 Perception Sensors Rationale

The ideal perception sensors 24 for autonomous robotic control or for teleoperation would have extremely high resolution, very high accuracy and very high frame rate. Unfortunately, these characteristics are not attainable with currently available sensors. Even if such sensors did exist, processing all the data could easily overwhelm the downstream data processing pipeline. Selecting the appropriate sensors therefore involves considering the trade-offs between resolution, accuracy, frame rate, size, weight, power consumption, and reliability. After considering these factors, we have come up with the following design.

3.1.1.1 Ladar Scanners

There are various ladar scanner units available, each with different resolutions, accuracies, frame rates, sizes, weight, power consumption and reliability. This embodiment of the invention uses a ladar scanner based on the Sick LMS ladar. This ladar scanner has high reliability, medium size and power, high accuracy, medium resolution and low frame rate. We compensate for the low frame rate by using the latency compensating algorithms that we developed, and the medium resolution is addressed by having two ladar scanners: a Forward-looking ladar and an omnidirectional ladar.

(1) Forward looking ladar scanner 24 with narrow FOV: this ladar scanner will scan the appropriate area in front of the vehicle 12 based on its speed and the terrain shape. For example, when the vehicle 12 is moving at a high speed, this scanner 24 will not scan the area near the vehicle 12. Instead, it will only scan the area farther away from the vehicle 12. By doing this, we fully utilize the resolution of the sensor 24 on the area of the environment 18 that is appropriate for the speed of the vehicle 12. The specification for this ladar scanner:

Ladar unit: Sick LMS FAST
Scanner unit: custom built vertical scanner which can be augmented with a
Horizontal FOV: fixed, +/−45 degrees
Vertical FOV: programmable, from 0 (fixed orientation) to 90 (+/−45) degrees (2) Omnidirectional ladar scanner with wide FOV: this ladar scanner 24 will scan the environment 18 around the vehicle 12. It has the capability to scan a small patch of the ground or scan the whole 360 degrees surrounding. The specification for this ladar scanner:

Ladar unit: Sick LMS FAST
Scanner unit: custom built omnidirectional horizontal scanner
Horizontal FOV: programmable, 0-360 degrees
Vertical FOV: fixed, +/−45 degrees These two sensors 24 configuration will enable us to get the benefit of a much higher resolution sensor with more flexibility at a lower cost factor. Both will be integrated onto a vehicle 24 in Phase II.

3.1.1.2 Cameras

We designed the perception sensor subsystem 24 so it is configurable and expandable. The design accommodates other types of cameras 24 as well (e.g., near IR), which can be added as needed in future phases. The main camera set on the forward-looking sensor pod 24 is the Bumblebee-2 camera from Point Grey Research, Inc. It has several characteristics that make it suitable for this program:

High resolution color image: 1024×768 color image
Medium frame rate: eighteen fps for capturing the dual 1024×768 pixel image
External trigger and strobe functionality: having external trigger and strobe allowed us to synchronize the camera trigger to the ladar and pose sensors
Compact and light weight: 157×36×47 mm, 342 gram
Low power The cameras on the omnidirectional sensor pod are the Firefly MV from Point Grey Research, Inc. These cameras are well suited to the need for this task:

Small board size: 40 mm×25 mm
VGA resolution color image: 640×480 color image
High frame rate: 60 fps at VGA resolution, up to 200 Hz at lower resolutions
External trigger and strobe functionality: having external trigger and strobe allowed us to synchronize the camera trigger to the ladar and pose sensors
Low power 3.1.1.3 Sensor Interface and On-Board Computer The sensor interface to the ladar 24 uses a custom made FPGA board. The board converts the ladar data to UDP packets for transmission over Ethernet. In addition, the board also synchronizes the ladar output with the rest of the system by time tagging the ladar data. Once it is time tagged, the variable and non-deterministic latency of UDP packets over Ethernet is no longer critical. The camera 24 also uses the same FPGA board to trigger the image acquisition. But unlike the ladar 24, the output of the camera 24 is not routed through the FPGA, due to bandwidth constraint. Instead, it is routed directly to the embedded on-board computer through a FireWire (IEEE-1394) bus.

In addition to accepting the output of the camera 24 over a FireWire (IEEE-1394) bus and the output of the ladar over Ethernet, the on-board computer does a few other things:

Sensor control: scanner angle, cameras shutter speed, aperture and gain
Communication: routing sensor data to the network
In Phase 2, this computer is expected to do data compression and some aspects of modeling Based on these requirements, we have selected to use the embedded Core Duo mini-ITX board, specifically the Commell LV-677 board. The board is equipped with 3 GB of ram, 2.0 GHz Core Duo CPU, and flash hard drive for ruggedness. In addition, the board has two mini-PCI slots, which gives us the ability to add a 2nd gigabit Ethernet port and a 802.11a/b/g card for wireless communication.

3.1.2 Position Estimation Rationale

In order to integrate the sensor data accumulated over time, we need to accurately know the sensor's 24 position and orientation (3-D pose) over time. In this program, we make an assumption that the sensor 24 is mounted rigidly to the vehicle 12, so the pose measurement of one sensor 24 can be converted to the pose of the other sensors 24 and of the vehicle 12.

Initially, we started with a low to medium grade GPS and IMU based system. We will increase the fidelity of the system as needed in the second and third year of this project. For Phase I, we selected the following components for pose estimation:

GPS: Garmin GPS 16, a WAAS GPS unit. In most cases, this unit has an error of +/−1.5 m.
IMU: For overall attitude measurement, we use a MEMS-based MTi unit from XSens. The unit contains a 3-axis MEMS gyro, a 3-axis MEMS accelerometer and a 3-axis magnetometer. We use this unit mainly to determine roll and pitch of the vehicle 12. Since the roll and pitch measurements are stabilized by and referenced to gravity, the drift from the gyro is bounded (provided the vehicle 12 stops often enough). (Heading is computed by a filter that fuses multiple signals including the IMU measurement, GPS, and odometry.)
Odometry: we have two modes of operation. On a vehicle 12 which has good odometry, the system has an input for quadrature encoder to measure the speed of the vehicle 12. On a vehicle 12 without such a capability, we can use the speed measurement from the GPS unit.

3.1.3 Synchronization

Since the sensor data is collected from the different sensors 24 asynchronously, they need to be time tagged and registered to each other. This is done by generating the synchronization signals for some sensors 24 and capturing the trigger out from the rest 24. We then use hardware timers, implemented on an FPGA, to measure these timing signals down to microsecond accuracy. For the master reference signal, we use the GPS PPS signal. Note that with this approach, the devices would even support integration of data from sensors mounted on multiple vehicles 12 because they all can sync to the same time source.

3.2 Design of Processing Algorithms to Generate Synthetic Video

The core of SACR is the set of algorithms that model the appearance world, that model the world to support motion prediction, that predict motion, and that generate video. Each of these algorithmic components has been addressed previously in other problem domains, but none of these technologies have been applied to this task or with a VRM as source. This section captures the best designs for each item from Phase I work.

3.2.1 Motion Prediction World Modeling

Motion prediction world models are used regularly in contemporary autonomous systems, including real-time motion prediction embedded within the Ranger system used as early as the 1990's, more recently on the DARPA PerceptOR program, and currently on the DARPA UPI program. The general approach involves fusing ladar data over time to estimate the height across terrain, creating a height map. Recent approaches expanded the 2D height map into a 3D voxel map, allowing explicit reasoning about the possibility that some ladar returns might come from compressible terrain such as grass in a meadow. The 3D volume allows fusion of terrain classifier output, assisting with the assessment of how much the terrain might "give" under the weight of the vehicle 12. The motion planner uses this information to dynamically determine the actual path of commanding certain motions, while also evaluating the cost of executing such a motion.

For Phase I, SACR employed one of a family of these autonomy algorithms. This particular algorithm is well suited to the urban environment 18, where vegetation and other compressible materials rarely obscure the terrain. The basic algorithm involves two main operations that can run concurrently. One operation adds new information to the model, while the second extracts a ground surface from the model. The model itself is a 2D grid oriented to be level in the local gravity reference plane. Each cell in the grid contains the set of 3D points that map to an "infinitely tall" column within the cell. Each 3D ladar point is simply added to the model. The second operation is to extract a single elevation value for each cell, which can be done in several ways depending on the accuracy of the 3D points. If the data is perfect, then the lowest point in the column is used as the elevation; with real data, the lowest 10% of the points can be averaged. Either way, once the initial elevation value is extracted across the map, a smoothing filter is applied to further reduce noise. Surface extraction is decoupled from model update (adding points to the internal model) to improve computational performance: points are added much more often than motion prediction executes.

3.2.2 Vehicle Motion Prediction

A critical element behind SACR latency compensation is the ability to accurately predict where a vehicle 12 will move in the future. The prediction must look ahead in time long enough to compensate for the actual round-trip communications latency inherent in the teleoperation system. Motion prediction is non-trivial, though, because it depends on vehicle 12 characteristics, terrain characteristics, terrain-vehicle interactions, and the operator commands issued to the vehicle 12. To make accurate predictions, all of this information must be brought together and then extrapolated forward in time. The Vehicle Motion Prediction module 570 performs this function in the SACR system 10, producing a trajectory representing the expected vehicle motion as a function of time.

Motion prediction technology has long been used in autonomous planning systems. The basic approach is to use a forward time simulation that projects the current vehicle pose forward in time by taking small time steps and incrementally adjusting vehicle posture, velocity, and acceleration as the simulated vehicle "executes" the previous commands. Put another way, the forward simulation integrates the equations of motion that model vehicle dynamics. Autonomous planners use this capability to precisely understand the expected path of the vehicle 12 in response to hypothetical new commands being considered. For SACR, we use the same core capability inside our motion prediction module. The actual algorithm is captured in the pseudocode sequence illustrated in FIG. 13.

3.2.3 Appearance World Modeling and Video Generation

Figure 14:
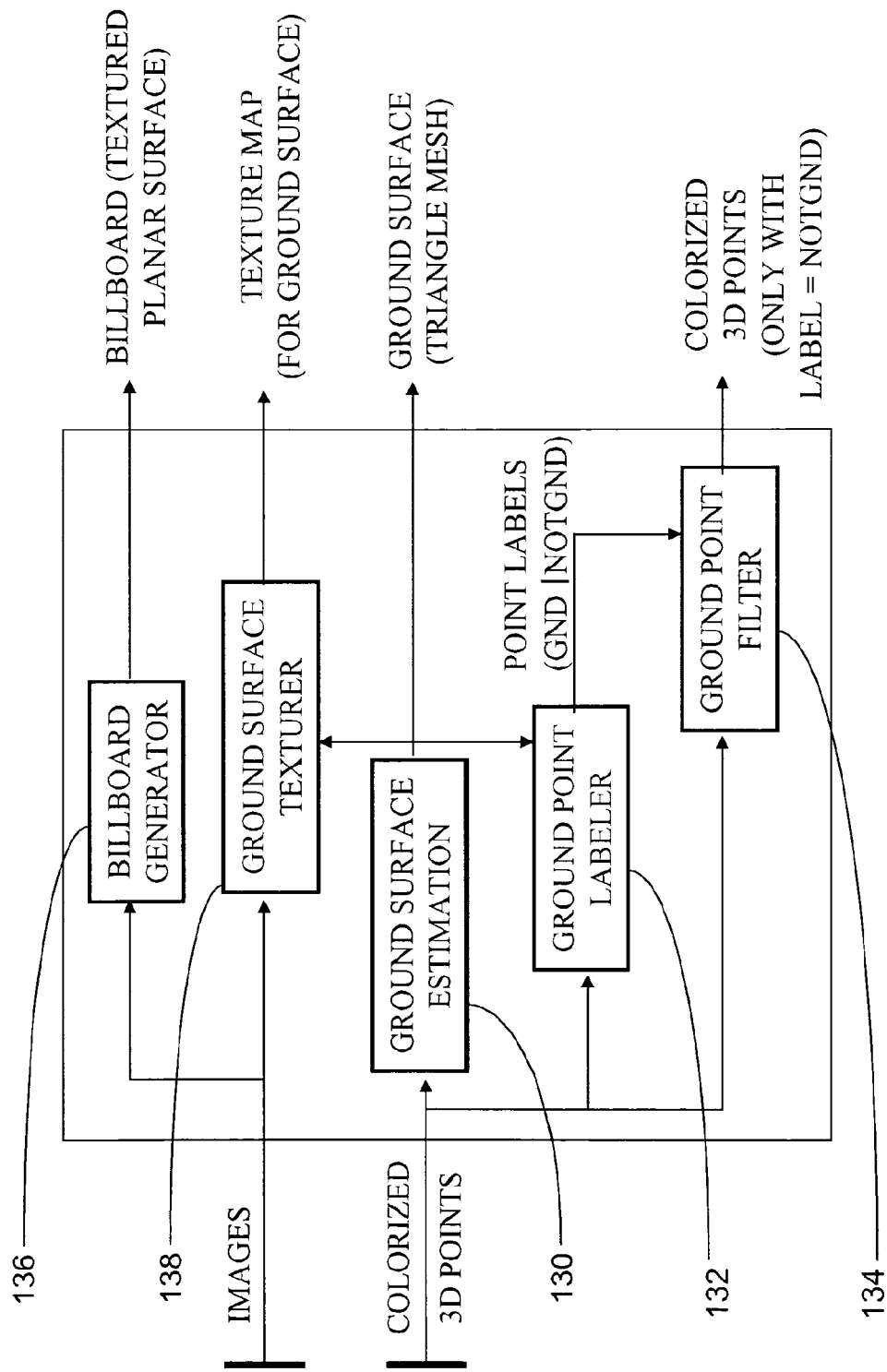
FIG. 14 illustrates modeling and video generation to generate the synthetic video according to one embodiment of the present invention.

Appearance modeling and video generation work closely together to generate the synthetic video that is the cornerstone of the SACR system. Phase I work on SACR explored a variety of approaches that could be applied to this problem, arriving at a Phase I design that combines three basic approaches: modeling the ground surface as a tessellated polygonal surface with a Ground Surface Estimation module 130, modeling other known-range objects as colorized points with a Ground Point Labeler module 132 and a Ground Point filter 134, and modeling everything else as a background texture with a Billboard Generator 136 and a Ground Surface Texturer 138. These approaches are illustrated in the block diagram in FIG. 14.

Initial work in Phase I began with an investigation of how far we could get using only 3D points as our "model". We chose this initial approach because points have several desirable properties including simplicity of representation and freeform shape modeling. As expected, we quickly learned that for objects in the world that have solid surfaces, points do a poor job of representing the visual appearance of those surfaces, especially as the viewing perspective deviates from the perspective used to collect the data. However, points did a good job of capturing complex structure of trees, for example.

The second step was to insert a ground surface estimator 130 in line with the 3D colorized points. The ground surface estimator 130 builds a surface model of the ground, represented as a triangle mesh draped on a heightfield $Z(x,y)$. The ground surface estimator 130 incorporates the 3D points sensed by the VRM 24 into this heightfield, and when needed sends the mesh out for additional processing. That processing can include mapping real images onto the surface to create a high resolution texture map to be pasted on the ground during rendering.

The ground surface enables a simple point labeling scheme: tag each point in the original data as either a ground point or a non-ground point. The labels are then used to filter out ground points, producing a smaller set of points representing "everything measured by the VRM 24 other than the ground."

The final step in the Phase I design is to generate a "billboard" to capture the long-range data for which the VRM 24 was unable to measure range. The billboard is simply a planar surface onto which a real image from the video cameras is draped. By placing this plane beyond the 3D points and the ground plane, synthetic video rendered from viewpoints near the original viewpoint look surprising realistic, with the user able to see far into the distance. Motion parallax error—here, the amount of displacement in the synthetic image that is introduced by using a flat billboard rather than the real scene geometry—is not eliminated, but is relatively small. The explanation for this effect traces to the relation of parallax to range: parallax is proportional to the ratio of lateral camera motion (the baseline)/range (i.e., distance from camera 24 to a given scene point). By correctly modeling 3D shape in the foreground, parallax clue to shape distortion occurs only for points with large ranges, which generate less parallax than do closer points. The lower the parallax, the less apparent it is to the viewer that the scene is modeled as a flat surface.

Figure 15:
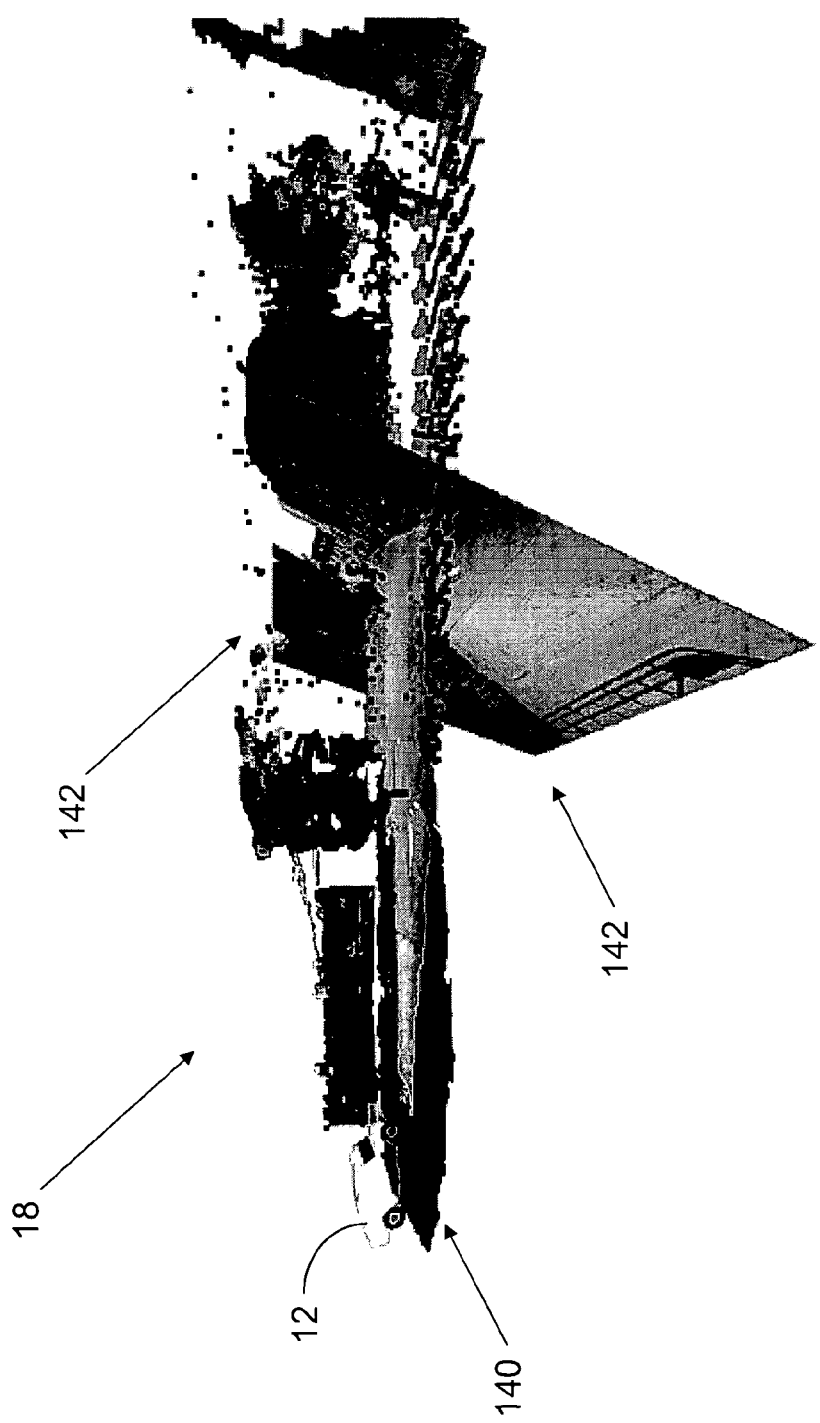
FIG. 15 illustrates one example of the use of a billboard in accordance with the present invention.

FIG. 15 illustrates a schematic example of the system 10. The data for this example comes from a real traverse of a vehicle 12 through a MOUT site. A virtual representation of the vehicle 12 is inserted at the vehicle's reported location, on the left of the diagram. The ground under the vehicle 12 is the ground surface 140, which runs out to the billboard 142 in the center of the scene. The points above the ground 140 between the vehicle 12 and the billboard 142 are the non-ground points from the point classification. The entire scene behind the billboard 142 is represented as points, because ground plane estimation is only executed in the near field. Note that the operator would not normally see this view in the display, because the viewpoint is normally close to the vehicle 12. However, the operator could choose to see this display even in the main user display.

Figures 16A, 16B:
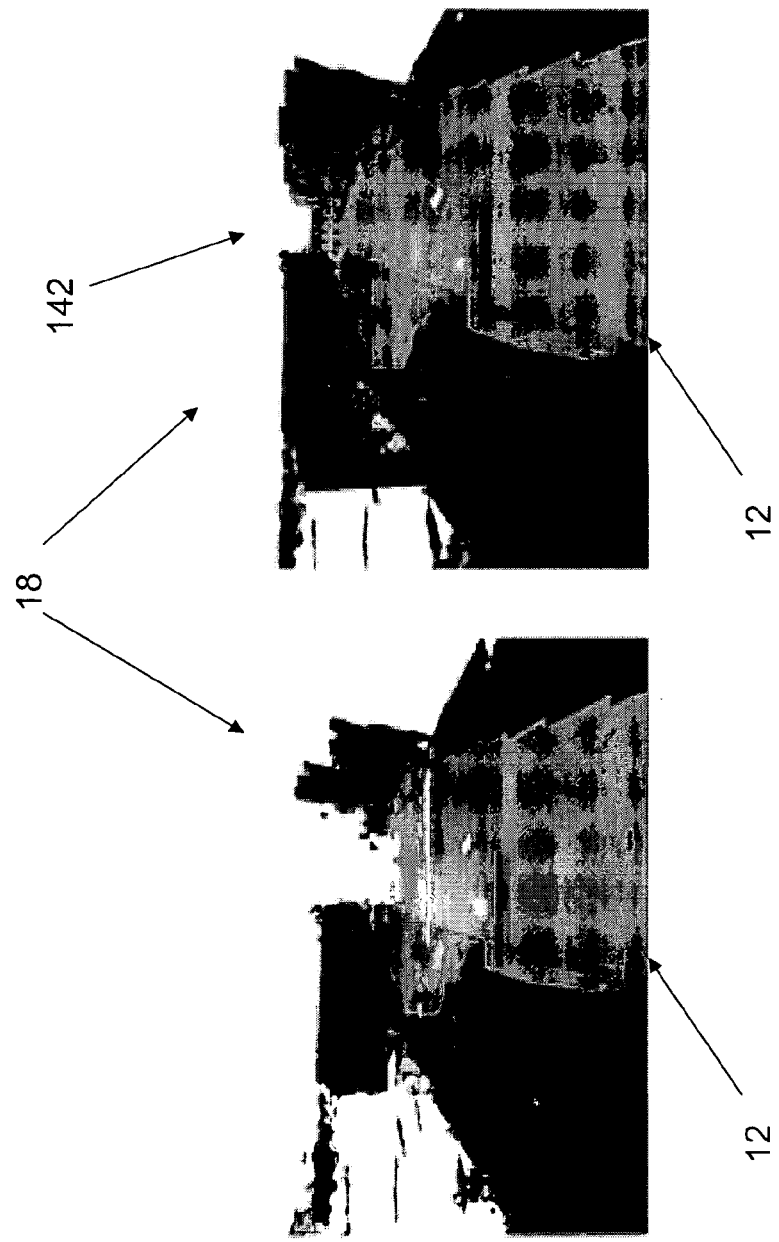
FIGS. 16a and 16b illustrate the same scene rendered from an "over the shoulder" viewpoint, both with (FIG. 16a) and without (FIG. 16b) the billboard.

FIGS. 16a and 16b illustrate the same scene rendered from an "over the shoulder" viewpoint, both without (FIG. 16a) and with (FIG. 16b) the billboard 142. As the images demonstrate, the billboard 142 greatly increases the apparent range of the operator's vision.

Figure 17:
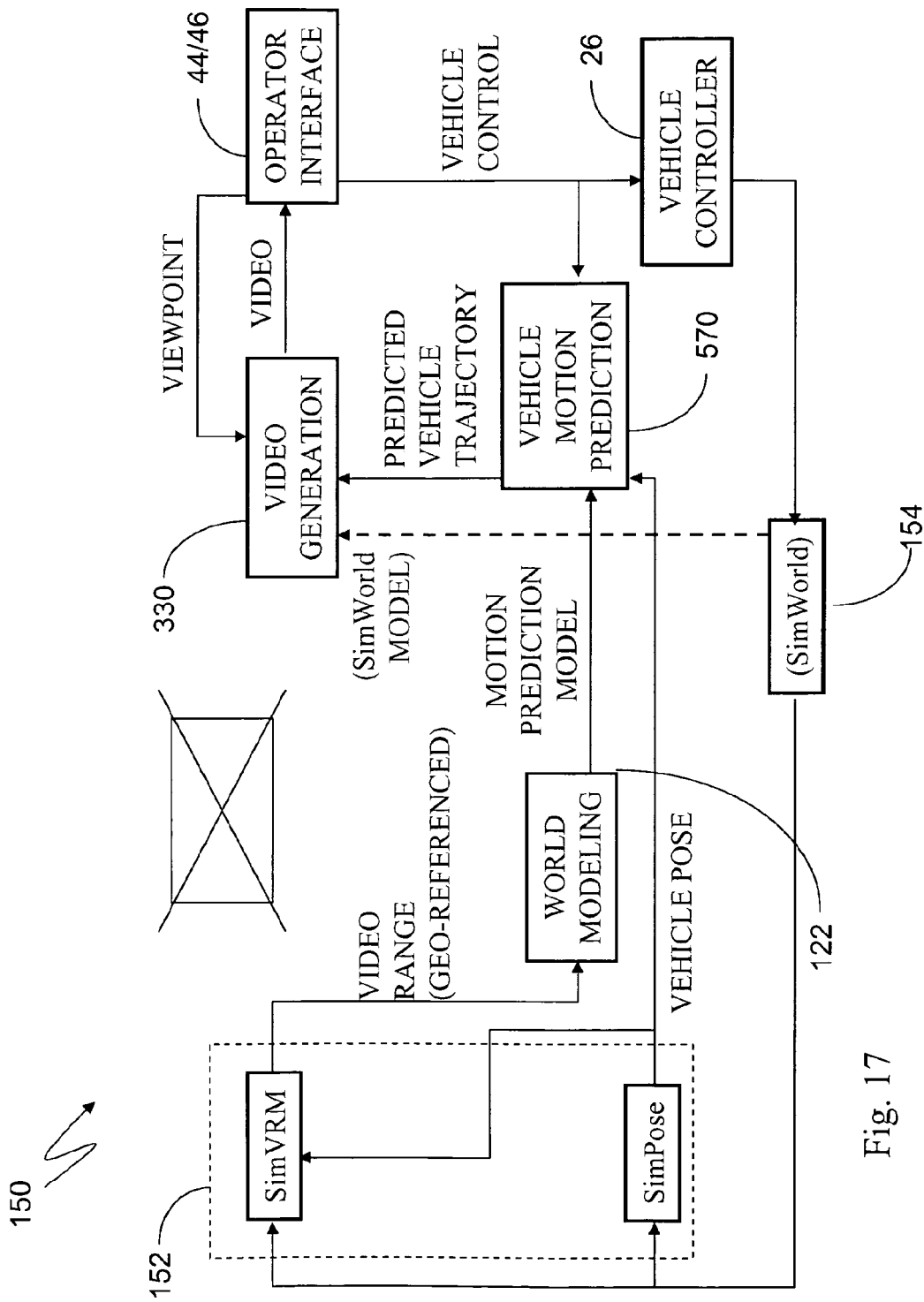
FIG. 17 illustrates one embodiment of the design of the driving simulator.

FIG. 17 illustrates one embodiment of the design of the driving simulator 150 according to the present invention. The Phase I plan included development of a driving simulator 150 as a way to explore how SACR technology could come together in a real driving scenario. The design of this simulator largely follows the overall system concept described in Section 2, Design Concept. Rather than using real sensors 24 that observe the real world, though, the driving simulator uses simulated sensors 152 that observe the virtual world 154. As planned, Phase I work focused on latency compensation rather than on integrating in the SACR appearance modeling and visualization algorithms. Instead of these algorithms, the driving simulator 150 simply rendered a virtual camera 152 at the viewpoint requested by the user. This approach allowed us to determine if SACR latency compensation was even remotely viable.

The simulator's 150 foundation is a virtual world 154 constructed in datafiles that are loaded by the runtime engine used to display the world. For Phase I, SACR selected the OpenSceneGraph framework for the simulation. The OpenSceneGraph is an open source high performance 3D graphics toolkit. Based around the concept of a SceneGraph, it provides an object oriented framework on top of OpenGL freeing the developer from implementing and optimizing low level graphics calls, and provides many additional utilities for rapid development of graphics applications. This approach was taken over Torque, a game engine, because of higher confidence that we could control the framework as needed, and could incorporate a wide variety of world models.

The simulator 150 was built using OpenGL pbuffers to simulate range sensors 152. The pbuffer allows the calling program to get access to the Z buffer, which contains (a modified form of) the range to the closest point in the world along the viewing ray through the pixel. By pulling out this data from the pbuffer and transforming it, the system successfully simulated a ladar sensor 24.

Another foundation of the simulator 150 is the dynamics engine. After significant consideration, our Phase I design uses a lightweight internally-developed motion simulation which integrations the equations of motion and forces contact with the ground. This simple approach uses the same motion prediction library as the "operational" code in the "Vehicle Motion Prediction" module 570 of FIG. 10, but with independent parameters to control the vehicle model. This approach allowed us to precisely configure the simulation to have the two vehicle models match exactly or introduce known deviations—a powerful way to understand sensitivity within the motion prediction step.

4 Proposed Phase II System Design

Phase I work focused on developing a general concept for SACR-enhanced remote operations, which provides two unprecedented capabilities: user capability to control the viewpoint via simulated cameras in a reconstruction of the world and latency compensation to improve controllability. Portions of the Phase I work were even included in a real-time driving simulation that created a qualitative feel for what might be possible. The main focus for Phase I, though, was on developing core algorithms and components: the VRM sensor 24, the modeling algorithms for appearance modeling 120 (FIG. 10) and the accompanying algorithms for synthetically creating virtual viewpoints, and modeling for motion prediction along with the motion prediction 570 (FIG. 10) itself. The results demonstrated in this area leads to an obvious question: what is the nominal system design concept moving into Phase II? This section addresses this question.

4.1 System Interface Drivers

With the general concept developed, the most significant missing element is the mapping of computation to system: what belongs on the vehicle 12 vs. on the OCS 14? Late Phase I work included a bandwidth and latency trade study to better understand the tradeoffs in this space. The conclusions of that study were threefold:

There appears to be significant opportunity for near-term engineering efforts to develop a working system based on transmitting selected sensor data. Analyses from Phase I suggest fairly simple methods can be used to judiciously reduce resolution and sampling rates on raw VRM data and to simultaneously apply standard compression techniques to drive bandwidth much lower than sending just one high-quality video from the vehicle 12.

There appears to be significant value in exploring the concept of model transmission in Phase II, as model-based transmission promises to provide the most bandwidth-efficient communication scheme. (Model-based transmission is loosely defined as developing 3D time-varying models of a scene on vehicle and transmitting the model, rather than sensor data, to the OCS 14.

Either of these approaches was shown to support latency compensation, to increase robustness to bursts and lulls in network throughput, and to support high-quality synthetic video displays to the operator.

4.2 System Design

Figure 18:
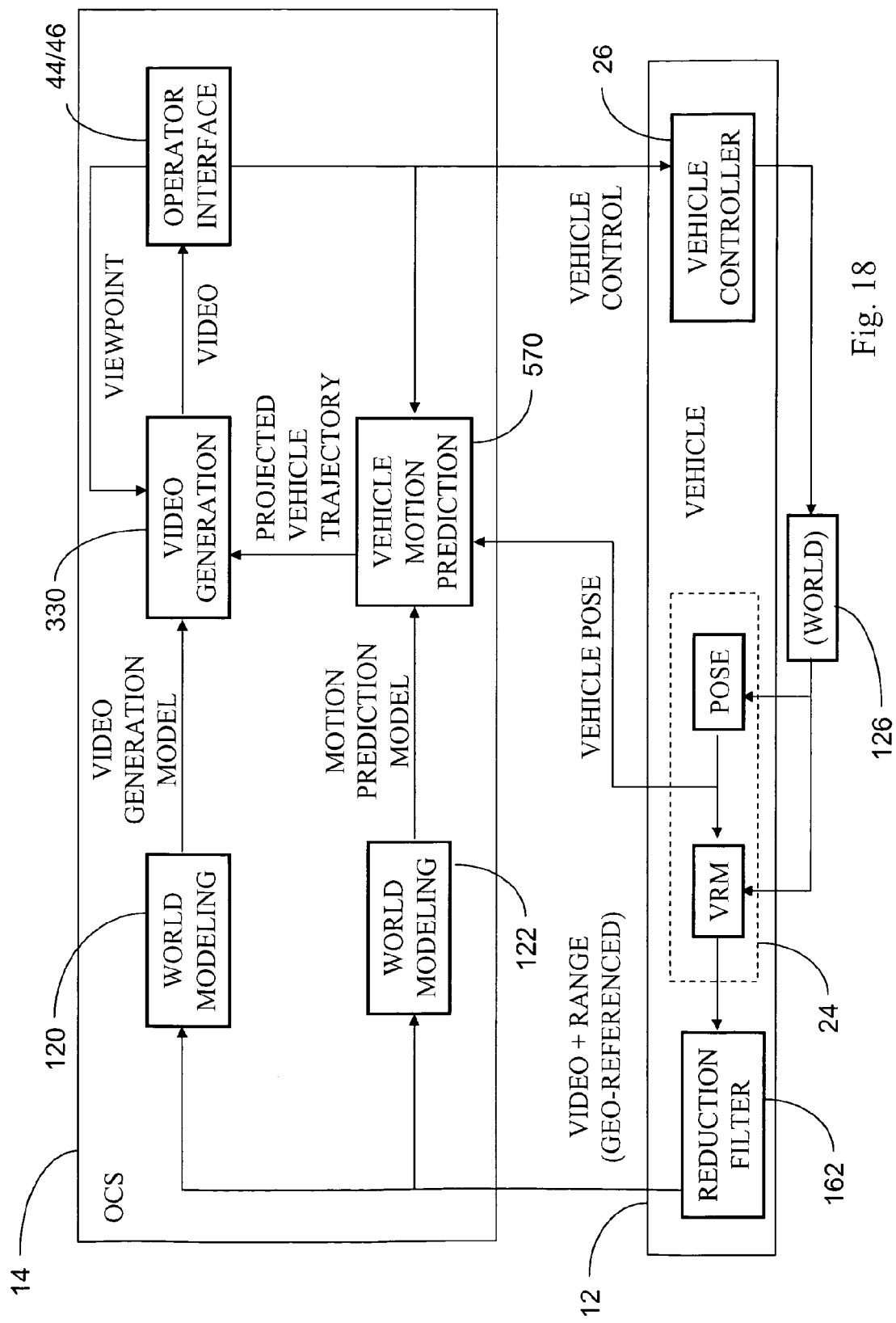
FIG. 18 illustrates the architectural overview of one embodiment of the system of the present invention.

The purpose of this section is to capture a proposed Phase II design based on the near-term engineering approach of judiciously transmitting raw VRM data to the OCS 14 and doing all modeling, motion prediction, and view generation on the OCS 14. FIG. 18 illustrates the architectural overview of this system, showing a slightly re-organized view of the conceptual architecture used to guide Phase I development.

As close examination reveals, there are only a few key differences compared to the conceptual Phase I architecture:

Explicit assignment of logical function either to the vehicle-side 12 computing or to the OCS-side 14 computing. As mentioned above, the interface from vehicle 12 to OCS 14 is raw data.

Insertion of a new logical function, Reduction Filter 160. This module 160 receives raw VRM data, then adjusts resolution and compresses the data for transmission.

4.3 Reduction Filter Module

The "Reduction Filter" 162 was a new module identified in Phase I work. The general idea is to insert an intelligent filter 162 between the VRM and the wireless network to dynamically control the amount of information flowing across the network 16. This particular filter 162 is far more than just a rate metering device, though: it uses explicit knowledge of the data being transmitted and of the intended use of the data on the receiver side 14 to control what data to send, what to discard, and what to reduce. It also incorporates standard data compression techniques to take the relevant information and squeeze it down as small as possible.

Phase I analysis for the bandwidth and latency trade study revealed a set of engineering techniques that can be applied, with relatively high certainty of benefit and low technical risk:
Imagery
Crop to remove regions with no useful scene information
Reduce frame rate
Reduce resolution of foreground regions
Apply standard lossy image compression (e.g., JPEG)
LADAR
Crop to remove regions with no useful scene information Apply standard lossless signal compression (e.g., delta coding, Huffman coding) It is expected that these techniques will reduce bandwidth substantially, without compromising image quality vs. standard video compression. In addition, the modeling and video generation approach used on the OCS 14 is expected to greatly improve video robustness to transient drops in network 16 bandwidth.

Looking further ahead, the Reduction Filter 162 concept can be taken much further. For example, the Reduction Filter 162 could run the same modeling code as is run in modules 120 and 122 in the OCS 14. By doing so, the Reduction Filter 162 could determine the importance of sending a particular piece of data by measuring the impact on the model (120, 122). If the model (120, 122) changes sufficiently, the information is deemed important and is sent out. If the model (120, 122) change is too small, the data is discarded. This approach is essentially model-based coding, but without transmission of the model itself. This is a possible research topic for Phase II.

5 Requirements Tracking and Compliance

The main objective for the SACR project is to generate video for remote driving (teleoperation) and indirect driving that compensates for latencies in the system and that allows multiple users to alter their viewpoints. Each of these requirements is addressed in Sections 2-4, above.

With the design now established, it is possible to show how the design satisfies the requirements. First, the design specifically abstracts above communications layers, allowing a unified handling of indirect driving and teleoperation. In Section 4, for example, the separation of vehicle 12 from OCS 14 supports both a wireless communications link 16, as is typical with remote operations, as well as an inside-the-vehicle 12 setup with a wired communications link 16. This abstraction itself does not address a full requirement, but does essentially cut the requirements in half.

Second, the video generation model from module 120 discussed in Section 2.7 and again in Section 3.2.3 directly addresses requirements to generate video for indirect driving and teleoperation. In both cases, the user can set the viewpoint to one appropriate to vehicle driving.

Third, latency compensation requirements are addressed by several components. The combination of world modeling (in modules 120, 122 in Section 2.4 and again in Section 3.2.3), vehicle motion prediction (in module 570 in Section 2.5 and again in Section 3.2.2), and video generation (in video generator 330 in Section 2.7 and again in Section 3.2.3) combine to address this capability.

Finally, support for multiple users to alter their viewpoints is accomplished with video generation (module 330 in Section 2.7 and again in Section 3.2.3).

Additional reporting requirements include providing ICDs (Interface Control Documents) for a simulation and for a VRM bench top prototype. These requirements were addressed as a byproduct of the development effort. In Phases 2 and 3, an additional requirement will be to provide prototype sensors.

The present invention has been described in terms of specific embodiments, such as sensors 24 in the form of cameras, such as specific hardware implementations, and such as specific processes implemented with the present invention. However, those specific embodiments are illustrative of the present invention, and the present invention is not limited to those specific embodiments. To the contrary, the present invention is applicable to other methods, apparatuses, systems, and technologies. For example, the present invention is also applicable to highly compressed storage and playback of motion pictures, and real-time video teleconferencing. Those and other variations and modifications of the present invention are possible and contemplated, and it is intended that the foregoing specification and the following claims cover such modifications and variations.

The invention claimed is:

1. A method for controlling an apparatus in an environment from a remote location, comprising:
   receiving, from an apparatus located at said remote location, data indicative of one or more actual states of said apparatus, with a non-zero latency;
   estimating a time T, wherein T represents the current time plus an estimated latency representing the time for a control signal to be received and acted upon by said apparatus;
   sending a control signal to said apparatus at said remote location;
   predicting a state of said apparatus at time T, based on one or more previous actual or predicted states of said apparatus and said control signal; and
   creating and displaying a plurality of virtualized views from a viewpoint, said virtualized views showing a series of interim predicted states representing a real-time transition of said apparatus from said one or more previous actual or predicted states to said predicted state.

2. The method of claim 1 further comprising the steps of:
   receiving, from said apparatus, data indicative of the actual state of the environment;
   predicting a state of the environment at time T;
   including, in said plurality of virtualized views, a transition of said environment from said actual state of said environment to said predicted state; and
   updating said virtualized view to include said actual state of said environment, when data indicative of said actual state of said environment is received form said apparatus.

3. The method of claim 2, wherein said predicted state of said apparatus is estimated from said predicted state of the environment.

4. The method of claim 3, wherein said predicted state of said apparatus is estimated from geometry of said predicted state of the environment.

5. The method of claim 1, wherein said virtualized view uses encoded data, said encoded data including:
   data indicative of a plurality of different representations of a portion of the environment.

6. The method of claim 5, wherein said data indicative of a plurality of different representations of a portion of the environment includes data received from one or more sensors on said apparatus.

7. The method of claim 5, wherein the step of creating and displaying said plurality of virtualized views includes retrieving said encoded data from a database.

8. The method of claim 5, wherein said encoded data includes data regarding the appearance and geometry of a portion of the environment.

9. The method of claim 8, wherein said data regarding the appearance of a portion of the environment is non-photorealistic.

10. The method of claim 8, wherein said data regarding the appearance of a portion of the environment causes said virtualize view to display the portion of the environment in a false color to represent additional information about the portion of the environment.

11. The method of claim 10, wherein said data regarding the appearance of a portion of the environment includes a portion of the environment that is not visible to an unaided human eye.

12. The method of claim 5, wherein said encoded data is produced with data from sensors on the apparatus.

13. The method of claim 5, wherein said encoded data is produced with data from a sensor that is not on the apparatus.

14. The method of claim 1, wherein said control signal includes encoded data.

15. The method of claim 1, wherein said control signal specifies movement and direction commands to be implemented by said apparatus.

16. The method of claim 1, wherein said control signal specifies a position and orientation to be achieved by said apparatus at a time in the future.

17. The method of claim 1 further comprising the steps of:
receiving, from said apparatus, data indicative of the actual state of said apparatus after acting upon said control signal; and
updating said virtualized view, wherein the updated virtualized view is indicative of the actual, received state of the apparatus.

18. The method of claim 1 wherein said plurality of virtualized views are rendered by modeling objects within said virtualized views using correct perspective and 3D information.

19. A system for operation in an environment, comprising:
an apparatus including a sensor;
a control agent;
a processor connected to at least one of the apparatus and control agent;
a memory device connected to the processor, wherein the memory includes computer-readable instructions which, when executed by the processor, cause the processor to perform the steps of:
receiving data indicative of one or more actual states of said apparatus, with a non-zero latency;
estimating a time T, wherein T represents the current time plus an estimated latency representing the time for a control signal to be received and acted upon by said apparatus;
sending a control signal to said apparatus;
predicting a state of said apparatus at time T, based on one or more previous states of said apparatus and said control signal;
creating and displaying a plurality of virtualized views from a viewpoint, said virtualized views showing a series of interim predicted states representing the transition of said apparatus from said one or more previous states to said predicted state;
receiving, from said apparatus, data indicative of the actual state of said apparatus after acting upon said control signal; and
updating said virtualized view, wherein said updated virtualized view is indicative of said actual state of said apparatus after acting upon said control signal.

20. The system of claim 19, wherein the control agent is part of the apparatus.

21. The system of claim 20, wherein the control agent and the apparatus share a common processor and share common memory.

22. The system of claim 19, wherein:
the apparatus includes a processor, memory, a sensor, and a transmitter/receiver;
the control agent includes a processor, memory, and a transmitter/receiver; and
the apparatus and the control agent are separate from each other and connected by a communications link between the transmitter/receiver in the apparatus and the transmitter/receiver in the control agent.

23. The system of claim 22, further comprising:
a vehicle controller connected to the processor in the apparatus;
an input device connected to the processor in the control agent; and
an output device connected to the processor in the control agent.

* * * * *